(12) United States Patent
Hoffmann et al.

(10) Patent No.: US 8,303,309 B2
(45) Date of Patent: Nov. 6, 2012

(54) INTEGRATED INTEROPERABLE TOOLS SYSTEM AND METHOD FOR TEST DELIVERY

(75) Inventors: Thomas Hoffmann, Newton, MA (US); Michael K. Russell, Wellesley, MA (US)

(73) Assignee: Measured Progress, Inc., Dover, NH (US)

( * ) Notice: Subject to any disclaimer, the term of this patent is extended or adjusted under 35 U.S.C. 154(b) by 1123 days.

(21) Appl. No.: 12/172,027

(22) Filed: Jul. 11, 2008

(65) Prior Publication Data

US 2009/0017432 A1 Jan. 15, 2009
US 2009/0317785 A2 Dec. 24, 2009

Related U.S. Application Data

(60) Provisional application No. 60/949,590, filed on Jul. 13, 2007.

(51) Int. Cl.
*G09B 21/00* (2006.01)
(52) U.S. Cl. .......................... 434/117; 434/322
(58) Field of Classification Search .......... 434/322–323, 434/350
See application file for complete search history.

(56) References Cited

U.S. PATENT DOCUMENTS

| | | | | |
|---|---|---|---|---|
| 4,700,297 A * | 10/1987 | Hagel et al. | ...................... | 705/30 |
| 5,274,819 A * | 12/1993 | Blomfield-Brown | ......... | 718/100 |
| 5,387,104 A * | 2/1995 | Corder | .......................... | 704/270 |
| 5,544,050 A | 8/1996 | Abe et al. | | |
| 5,690,493 A * | 11/1997 | McAlear, Jr. | ................. | 434/178 |
| 5,827,066 A * | 10/1998 | Henter | .......................... | 434/188 |
| 5,879,162 A * | 3/1999 | Bergman | ....................... | 434/118 |
| 6,033,224 A * | 3/2000 | Kurzweil et al. | ............. | 434/112 |
| 6,049,781 A * | 4/2000 | Forrest et al. | .................... | 705/30 |
| 6,460,056 B1 * | 10/2002 | Horii | .............................. | 715/203 |
| 6,590,592 B1 * | 7/2003 | Nason et al. | ................... | 715/778 |
| 6,816,603 B2 | 11/2004 | David et al. | | |
| 6,871,043 B2 * | 3/2005 | Sanda | ....................... | 434/307 R |
| 6,972,763 B1 * | 12/2005 | Millett et al. | .................. | 345/440 |
| 6,981,246 B2 * | 12/2005 | Dunn | .......................... | 717/127 |
| 7,174,265 B2 | 2/2007 | Basham et al. | | |
| 7,217,134 B2 * | 5/2007 | Hansen et al. | ................ | 434/322 |
| 7,805,382 B2 * | 9/2010 | Rosen et al. | ................... | 705/321 |
| 2001/0047280 A1 * | 11/2001 | Alexander et al. | ............... | 705/1 |
| 2002/0051956 A1 * | 5/2002 | Thomsen | ....................... | 434/219 |
| 2002/0155419 A1 * | 10/2002 | Banerjee et al. | ............. | 434/322 |
| 2002/0192624 A1 * | 12/2002 | Darby et al. | ................... | 434/236 |
| 2003/0144846 A1 * | 7/2003 | Denenberg et al. | ........... | 704/277 |
| 2004/0015862 A1 * | 1/2004 | Dunn | .......................... | 717/124 |
| 2004/0106088 A1 | 6/2004 | Driscoll et al. | | |
| 2004/0126745 A1 * | 7/2004 | Bell et al. | ....................... | 434/201 |
| 2004/0157193 A1 * | 8/2004 | Mejias et al. | .................. | 434/118 |
| 2004/0161728 A1 | 8/2004 | Benevento et al. | | |
| 2004/0191731 A1 * | 9/2004 | Stork | ............................. | 434/180 |
| 2004/0218451 A1 * | 11/2004 | Said et al. | ...................... | 365/222 |

(Continued)

*Primary Examiner* — Robert J Utama
(74) *Attorney, Agent, or Firm* — Maine Cernota & Rardin

(57) ABSTRACT

In an exemplary embodiment, a computer-implemented method for implementing a test delivery system is provided. The method includes implementing a plurality of interoperable accommodation and accessibility tools, and providing an interface to the test with the plurality of interoperable accommodation and accessibility tools provided on the interface. The method also includes receiving one or more tool settings for a test-taker specifying one or more permitted tools in the plurality of interoperable accommodation and accessibility tools, and customizing the interface based on the one or more tool settings to allow the test-taker access to the one or more permitted tools during the test. The method further includes allowing the test-taker to activate or deactivate each of the one or more permitted tools.

45 Claims, 23 Drawing Sheets

U.S. PATENT DOCUMENTS

| | | |
|---|---|---|
| 2004/0267500 A1* | 12/2004 | Gedlinske et al. ............ 702/179 |
| 2005/0164153 A1* | 7/2005 | Beatty et al. ................. 434/350 |
| 2005/0175974 A1* | 8/2005 | Hansen et al. ................ 434/322 |
| 2005/0233287 A1* | 10/2005 | Bulatov et al. ................ 434/114 |
| 2006/0026001 A1 | 2/2006 | Bravin et al. |
| 2006/0090138 A1* | 4/2006 | Wang et al. ................... 715/760 |
| 2006/0134585 A1* | 6/2006 | Adamo-Villani et al. .... 434/112 |
| 2006/0286533 A1 | 12/2006 | Hansen et al. |
| 2007/0074167 A1* | 3/2007 | Cohrs et al. ................... 717/124 |
| 2007/0117083 A1 | 5/2007 | Winneg et al. |
| 2007/0174765 A1 | 7/2007 | Schleppenbach et al. |
| 2007/0211071 A1* | 9/2007 | Slotznick et al. ............. 345/594 |
| 2007/0275361 A1* | 11/2007 | Tezuka et al. ................. 434/351 |
| 2009/0317785 A2* | 12/2009 | Hoffmann .................... 434/323 |

* cited by examiner

Students in New Hampshire Fall 2007

| | Student Name | | Read Aloud | | | Reading Helpers | | Magnification | | Stimulus Management | | | Input | Alternate Language | | | update | |
|---|---|---|---|---|---|---|---|---|---|---|---|---|---|---|---|---|---|---|
| ID | last | first | Directions only | All | JAWS | Color Overlay | Reverse Contrast | Magnifier | Micro-scope | Auditory Calming | Masking: Answer | Masking: Custom | Braille Display | Signed English | ASL | Spanish | SET | last modified (server time) |
| 201 | Hoffman | Tom | ☐ | ☐ | ☐ | ☐ | ☐ | ☑ | ☐ | ☐ | ☐ | ☑ | ☐ | ☑ | ☑ | ☐ | SET | 10/31/07 |
| 202 | Russell | Mike | ☐ | ☑ | ☐ | ☑ | ☐ | ☑ | ☐ | ☑ | ☐ | ☐ | ☐ | ☐ | ☐ | ☐ | SET | 11/21/07 |
| 203 | Fedorchak | Gaye | ☐ | ☑ | ☐ | ☐ | ☐ | ☑ | ☐ | ☐ | ☑ | ☑ | ☐ | ☐ | ☐ | ☐ | SET | 11/31/07 |
| 204 | Kurtz | Timothy | ☐ | ☐ | ☐ | ☐ | ☐ | ☑ | ☐ | ☑ | ☑ | ☐ | ☐ | ☐ | ☐ | ☐ | SET | 10/31/07 |
| 205 | Hofman | Peter | ☐ | ☐ | ☐ | ☐ | ☐ | ☐ | ☐ | ☐ | ☐ | ☐ | ☐ | ☐ | ☐ | ☐ | SET | ( ) |
| 206 | Dobbs | Rick | ☑ | ☐ | ☐ | ☑ | ☑ | ☑ | ☑ | ☑ | ☐ | ☐ | ☐ | ☐ | ☐ | ☐ | SET | 10/31/07 |
| 207 | Carling | Dona | ☐ | ☐ | ☐ | ☐ | ☐ | ☑ | ☐ | ☐ | ☐ | ☐ | ☑ | ☐ | ☐ | ☑ | SET | 10/31/07 |
| 208 | Picou | Chris | ☐ | ☐ | ☐ | ☐ | ☐ | ☐ | ☐ | ☐ | ☐ | ☐ | ☐ | ☐ | ☐ | ☐ | SET | ( ) |

*Fig. 3B*

Question 3

Julia analyzed the data on a chart showing the diameters of five planets in Earth's solar system.

| Planet Name | Diameter |
|---|---|
| Earth | 7,926 miles |
| Jupiter | 88,846 miles |
| Mercury | 3,031 miles |
| Neptune | 30,608 miles |
| Pluto | 1,429 miles |

Julia wrote down 87,417 miles. Which of the following was she describing about the diameters in the chart?

Ⓐ mean

MAGNIFICATION  A

*— 624*

| | Question 3 | | 10th Grade Mathematics: Tess Morgan |
|---|---|---|---|
| ters of five planets in Earth's solar system. | | | PREVIOUS |
| | | | NEXT |
| | Planet Name | Diameter | MARK THIS QUESTION |
| | Earth | 7,926 miles | OPTIONS |
| | Jupiter | 88,846 miles | Magnification |
| | Mercury | 3,031 miles | A —○— A |
| | Neptune | 30,608 miles | Color Chooser |
| | Pluto | 1,429 miles | |
| wrote down 87,417 miles. Which of the foll | | | Calculator |
| she describing about the diameters in the ch | | | References |
| | | | Get Directions |
| | | | Finish or Review |

INTEGRATED INTEROPERABLE TOOLS SYSTEM AND METHOD FOR TEST DELIVERY

RELATED APPLICATIONS

The present application claims priority to U.S. Provisional Application No. 60/949,590 filed on Jul. 13, 2007, the entire content of which is incorporated by reference.

FIELD OF THE INVENTION

Exemplary embodiments relate generally to systems and methods for testing and assessment of individuals who require testing accommodations and/or computer accessibility tools.

BACKGROUND

Recent U.S. federal legislation requires a majority of high school students with disabilities and English language learners (ELL) to participate in state assessments used for accountability purposes. The federal guidelines allow the use of assistive accommodations by these students during tests to accommodate their special needs. However, the extent to which accommodations are provided to students with disabilities and ELL students varies considerably within states. For example, schools often face difficulties in providing some basic accommodations to a large number of students due to a shortage of space, equipment and staff.

Some states have written guidelines on the roles and responsibilities of people who assist in the administration of accommodations, e.g. readers, scribes and sign language interpreters. However, there is great variability in the breadth and depth of these guidelines, and accommodations are generally not delivered in a standardized or equitable manner. For example, "read aloud" accommodations provided by human readers (in which a human reader reads out the test) notably have the following problems: the quality of the readers vary widely, the readers occasionally mispronounce or mis-read words, the readers sometimes provide intentional as well as unintentional hints to the correct answer, and the students are sometimes reluctant to ask the readers to re-read parts of the test. Thus, while the students are provided with a read aloud accommodation, it is likely that all students do not have an equal opportunity to demonstrate their achievement because of the unstandardized delivery of the accommodation.

Moreover, there are significant differences between the daily accommodations provided to students during instruction and the accommodations that are available during testing. For example, students who are provided with certain instructional accommodations such as one-on-one reading assistance or auditory calming are often not provided with comparable testing accommodations. Furthermore, accommodations recommended for instruction (e.g., computers/other assistive devices) are rarely used during testing.

SUMMARY

Exemplary embodiments provide a testing interface which has all available accommodation tools built into the interface. The testing interface does not rely on external applications or tools to provide accommodations, and can provide access to the full set of accommodation tools on its own.

In one exemplary embodiment, one or more computer-readable media for storing one or more computer-executable instructions that when executed cause a computer to implement a test delivery system are provided. The instructions include instructions for implementing a plurality of interoperable accommodation tools, the plurality of interoperable accommodation tools facilitating test-taking for test-takers. The instructions also include instructions for providing an interface to the test with the plurality of interoperable accommodation tools provided on the interface. The instructions further include instructions for receiving one or more tool settings for a test-taker specifying one or more permitted tools in the plurality of interoperable accommodation tools, customizing the interface based on the one or more tool settings to allow the test-taker access to the one or more permitted tools during the test, and allowing the test-taker to activate or deactivate each of the one or more permitted tools. The instructions also include instructions for tracking the use of the one or more permitted tools by the test-taker during the test In another exemplary embodiment, a computer-implemented method for implementing a test delivery system is provided. The method includes implementing a plurality of interoperable accommodation tools, the plurality of interoperable accommodation tools facilitating test-taking for test-takers, and providing an interface to the test with the plurality of interoperable accommodation tools provided on the interface. The method also includes receiving one or more tool settings for a test-taker specifying one or more permitted tools in the plurality of interoperable accommodation tools, and customizing the interface based on the one or more tool settings to allow the test-taker access to the one or more permitted tools during the test. The method further includes allowing the test-taker to activate or deactivate each of the one or more permitted tools.

In yet another exemplary embodiment, a system for implementing a test delivery system is provided. The system includes a display device and a processor. The display device displays an interface to a test with a plurality of interoperable accommodation tools provided on the interface. The plurality of interoperable accommodation tools facilitate test-taking for test-takers. The display device also receives one or more tool settings for a test-taker specifying one or more permitted tools in the plurality of interoperable accommodation tools, and customizes the interface based on the one or more tool settings to allow the test-taker access to the one or more permitted tools during the test. The display device further allows the test-taker to activate or deactivate each of the one or more permitted tools. The processor processes the interface and the plurality of interoperable accommodation tools.

In still another exemplary embodiment, a computer-implemented method for selecting and displaying accommodation tools is provided. The method includes receiving a group of accommodation tools selected by a test administrator for a test. The method also includes receiving a sub-group of accommodation tools from the group of accommodation tools, the sub-group selected by a test-taker taking the test. The method further includes displaying the sub-group of accommodation tools on a testing interface to facilitate taking the test by the test-taker.

In a further exemplary embodiment, a computer-implemented method for implementing a test delivery system is provided. The method receives a test, implements a plurality of interoperable accommodation tools, the plurality of interoperable accommodation tools facilitating test-taking for test-takers, and provides an interface to the test with the plurality of interoperable accommodation tools provided on the interface. The method receives one or more tools settings for each of one or more test-takers, the one or more tool settings specifying one or more permitted tools in the plurality of interoperable accommodation tools. For each of the one or more test-takers, the method customizes the interface based on the one or more tool settings to allow the test-taker access to the one or more permitted tools during the test. The method also allows each of the one or more test-takers to activate or deactivate each of the one or more permitted tools. The method further includes receiving at least one result from at least one of the one or more test-takers taking the test with the interface, and generating a report of the at least one result, the report including an indication of the one or more tool settings for the test-taker during the test.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which:

FIG. 3B illustrates an exemplary tool manager interface provided in a web browser which may be used to set permissions for accommodation tools;

FIG. 6C illustrates an exemplary enlarger tool which is designed for test-takers who may benefit from having only the test-item enlarged in the "main text area" of the testing interface;

FIGS. 11A and 11B illustrate an exemplary test-item masking tool which enables a test-taker to focus his/her attention directly on the test-item;

DETAILED DESCRIPTION

Figure 1:
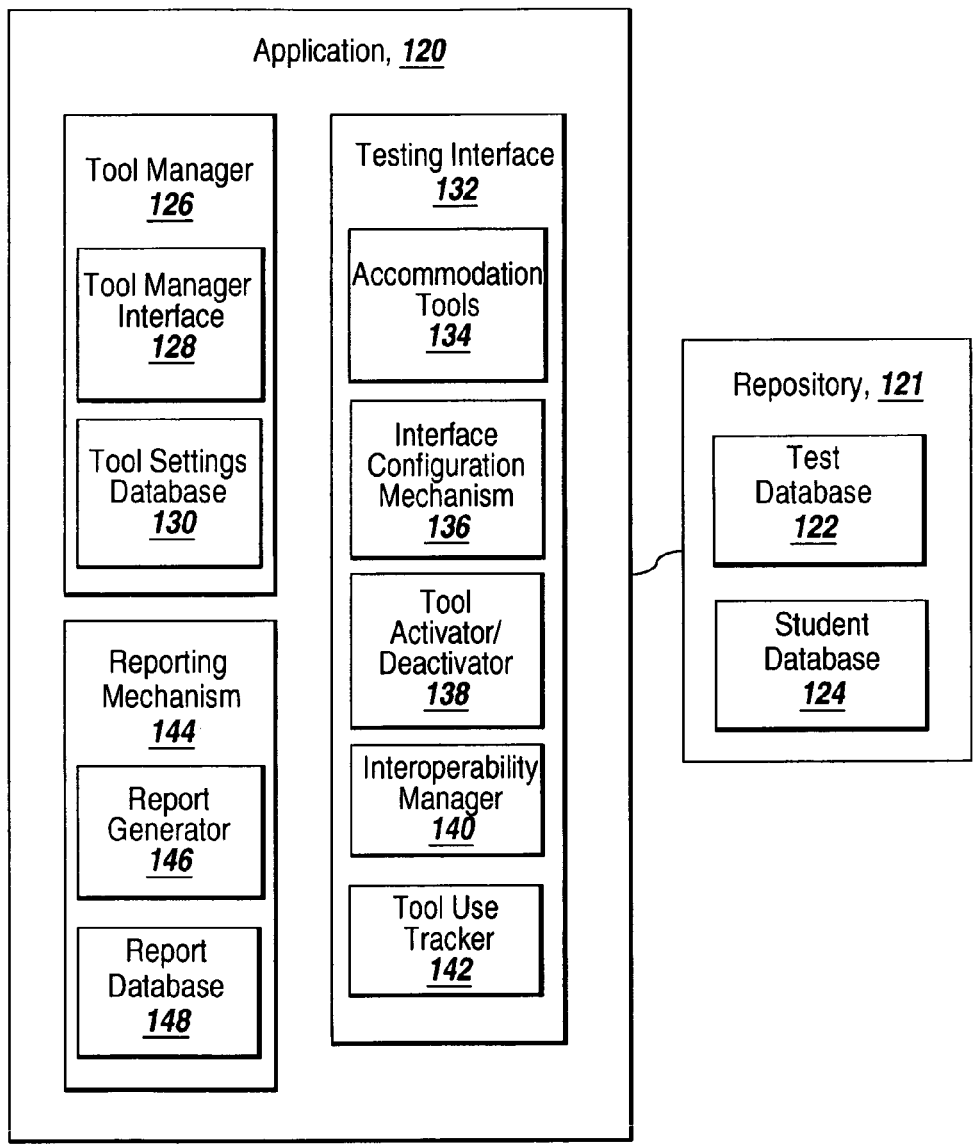
FIG. 1 illustrates a block diagram of an exemplary embodiment.

"Testing accommodations" are changes that can be made to a testing process so that test-takers with special testing needs can fully participate in a test. These changes can include, for example, changes in the way the test is administered or responded to by the test-taker.

Students with special needs are at a disadvantage in taking standardized tests, and their special needs may prevent them from demonstrating their full knowledge or understanding of the material. Testing accommodations may be provided to such students when taking standardized tests to meet their special needs. These testing accommodations may include, for example, read aloud accommodations for students with reading problems like dyslexia, translation tools for English language learners, enlarged text for students with low vision, etc.

"Accommodation tools" allow the implementation of testing accommodations to facilitate test-taking by students with special needs. For computer-based tests, these accommodation tools may be provided as a part of a computer interface, as a software application, a module or portion of an interface or an application, etc.

Exemplary embodiments may provide a testing interface for delivering a computer-based test. A "testing interface," as provided by exemplary embodiments is a platform which may deliver a computer-based test to a test-taker, allow the test-taker to respond to the test, and/or collect and transmit results of the test. The testing interface of exemplary embodiments may have a complete set of all available accommodation tools built into the interface. Based on the test settings for each test-taker, the testing interface may be customized to provide access to a subset of the accommodation tools.

The accommodation tools provided in the testing interface of exemplary embodiments may be programmatically built into the interface, as opposed to being provided by external tools or interfaces. As such, the different accommodation tools can be provided on the testing interface in a pre-defined, organized manner such that the test-taker's view of the test-items is not blocked out.

The accommodation tools of exemplary embodiments may also be "interoperable," i.e. the different tools may operate simultaneously without compatibility issues, a second set of tools may be activated while a first set is already active, potential confusion may be automatically detected and resolved, certain tools may not be allowed to operate together, and/or a second tool may be automatically activated or deactivated in response to the activation of a first tool. A "confusion" is an aspect of the testing interface that may be potentially confusing to a test-taker, caused by the simultaneous use of two or more accommodation tools. Exemplary embodiments may also automatically detect and resolve conflicts arising programmatically from the use of two or more accommodation tools.

Exemplary embodiments provide several improvements over existing technologies that allow access to accommodation tools during testing. Exemplary embodiments provide a testing interface which has all available accommodation tools built into the interface. The testing interface does not rely on external applications or tools to provide accommodations, and can provide access to the full set of accommodation tools on its own.

As such, the testing interface of exemplary embodiments is able to provide the accommodation tools in a predefined, organized layout on the interface, which prevents the tools from cluttering the test-taker's view of the test-items. The testing interface is able to coordinate and control interoperability among multiple accommodation tools, and detect and resolve situations resulting from the simultaneous use of certain tools that may be potentially confusing to a test-taker. Because exemplary embodiments are able to coordinate interoperability among multiple tools, several advances have been made in the way several accessibility tools function. For example, a signing tool provided by exemplary embodiments allows the test-taker to select a block of text and then have that block of text presented in American Sign Language or Signed English. In contrast, existing technologies merely provide students with an external DVD player and require students to employ separate controllers to fast-forward or rewind through video files to locate desired sections of signed text.

Because exemplary embodiments are designed so that the accommodation tools can operate in tandem, the use of accommodation tools is not treated as an exception that requires the testing interface to import external accommodation tools. Instead, exemplary embodiments provide all the tools and then remove access to certain tools for test-takers who do not require those tools. Exemplary embodiments allow a higher authority to set permissions providing access to a set of tools for each test-taker. Exemplary embodiments also allow the test-taker to activate or deactivate each of the permitted tools during the test. In this way, the test-taker, rather than the higher authority, controls when and how a permitted tool is used during testing.

Because the accommodation tools are built directly into the test delivery interface, exemplary embodiments are able to track the use of each tool at the test-item level. For example, exemplary embodiments can detect and record the use of a read aloud tool for one item and non-use of the read aloud tool for a different item. This type of tool use tracking allows collection of detailed and accurate data regarding the use of specific accommodation tools during the test.

The present Assignee has entered into contracts with the states of Florida and New Hampshire to pilot test exemplary embodiments for their state tests. In a New Hampshire pilot test, there was a six-fold increase in the number of test-takers qualified to use accommodations who opted to use the testing interface of exemplary embodiments, over the number of such test-takers who opted to use accommodations provided by existing technologies. In a Florida pilot test, use of the testing interface of exemplary embodiments increased the performance of test-takers by half a standard deviation, over their performance with accommodations provided by existing technologies. In the Florida pilot test, the test-takers also overwhelmingly (79%) stated a desire to use the testing interface of exemplary embodiments instead of existing technologies. Thomas Hoffmann, "Examining the Feasibility and Utility of the Universal Assessment System," Report to the National Science Foundation (2007).

An exemplary embodiment was awarded a 2008 da Vinci Award® by the National Multiple Sclerosis Society, which "recognize[s] individuals, organizations and corporations in the engineering, construction and technical fields for innovative developments and research in adaptive technology that embrace the 'Universal Design Principal.'" The da Vinci Awards® honors "exceptional design and engineering achievements in accessibility and universal design that empower people of all abilities." "The da Vinci Awards," National Multiple Sclerosis Society, Michigan Chapter. http://www.nmssmi.org/davinci (accessed: Jul. 10, 2008).

FIG. 1 illustrates a block diagram of an exemplary embodiment. A repository 121 may include a test database 122 containing one or more tests to be taken by test-takers. Each test may include one or more separate test-items which may be multiple-choice questions, short answer items, extended response items, etc. Each test may have associated information that may be set by a test administrator in configuring the test, e.g. state/regional preferences. Such associated information may determine how the test is administered in the testing interface of exemplary embodiments. The test database 122 may be organized to provide a mapping between each test-taker, e.g. by his/her student ID, and the test to be taken by the test-taker.

The repository 121 may include a test-taker database 124 containing information on one or more individuals who will take one or more tests contained in the test database 122. The information may include basic information on each test-taker, e.g. the name, state, district, school, teacher. A teacher may create a classroom account for his/her students, allowing the students to register to their teacher's class account. The test-taker database 124 may include information on such class accounts.

The repository 121 may be located at each school, or may be provided in an application 120. In an embodiment in which the repository 121 is provided separately from the application 120, the application 120 is configured to access information in the repository 121, as illustrated in FIG. 1.

The application 120 may include a tool manager 126 which allows a teacher or any other authorized person to specify one or more accommodation tools permitted for each test-taker taking a test, e.g. a test stored in the test database 122. The tool manager 126 may include a tool manager interface 128 which accepts input from an authorized person specifying the permitted accommodation tools. In an exemplary embodiment, the tool manager interface 128 may be provided via the Internet in a browser window. In another exemplary embodiment, the tool manager interface 128 may be provided off-line as a stand-alone interface or as part of another interface. The tool manager 126 may also include a tool settings database 130 which stores the accommodation tool settings specified by an authorized person in the tool manager interface 128. The tool settings database 130 may, for example, provide a mapping between each test-taker and a set of accommodation tools that the test-taker is permitted to use during the test.

The application 120 may include a testing interface 132 which is the test delivery platform provided by exemplary embodiments. The testing interface 132 may be a graphical user interface (GUI) which presents a test from the test database 122 to a test-taker and allows the test-taker to read test questions and enter responses to them. The testing interface 132 may operate within a Shockwave Flash™ based environment that enables a test to be delivered on-line, locally through a CD-ROM, or directly on a hard drive. In one embodiment, the testing interface 132 may be configured to operate in a secure testing environment. In another embodiment, the testing interface 132 may be configured to operate in non-secure environments, e.g. for classroom delivery of practice tests or for providing accessible content.

A full set of all accommodation tools 134 available during testing is provided with the testing interface 132, i.e. the accommodation tools are packaged together with the testing interface 132 and are built into the testing interface 132. As such, the testing interface 132, on its own, is able to provide access to any accommodation tool needed for a test-taker. External accommodation applications are not necessary, and accommodation applications need not be provided separately from the testing interface 132.

Additionally, any accommodation tools used by the test-taker are built into the testing interface 132 and do not require separate windows or browsers to be opened up in addition to the testing interface 132. This provides for an organized testing interface in which the different tools may be built into the interface in a predefined, organized fashion, and in which the test-taker's view of the test-items is not blocked. This also allows the test-taker to perform a test with any and all accommodation tools available on any computer rather than a computer that has specific software or external accommodation tools already installed. As such, the testing interface 132 of exemplary embodiments is convenient to use.

The accommodation tools 134 are interoperable, and two or more tools may be used simultaneously without creating any confusion for the test-taker. The test-taker may also simultaneously activate all available tools. The test-taker may activate additional tools without having to deactivate ones that are already activated.

The testing interface 132 may include an interface configuration mechanism 136 which configures or customizes the testing interface 132 for each test-taker based on the accommodation tools permitted for the test-taker as indicated in the tool settings database 130. The interface configuration mechanism 136 displays and allows use of only the permitted accommodation tools and does not display any non-permitted tools. For example, if the test-taker is not permitted to use any accommodation tools, then the interface configuration mechanism 136 customizes the testing interface 132 to not display any tools. If the test-taker is permitted to use all available accommodation tools, then the testing interface 132 is customized to show and allow use of all the accommodation tools 134 which are built into the customized interface. Similarly, if the test-taker is permitted to use a subset of all available accommodation tools, then the testing interface 132 is customized to show and allow use of that subset of the accommodation tools 134 which is built into the customized interface.

The testing interface 132 may include a tool activator/deactivator 138 which allows the test-taker to selectively turn on/off the permitted accommodation tools presented on the testing interface 132 during the test. This allows the test-taker to have a level of control over the appearance and functionality of the testing interface 132, and does not restrict the test-taker to the set of accommodation tools permitted for him/her. For example, the tool settings database 130 may indicate that the test-taker is permitted to use a magnifying tool. As such, the testing interface 132 may be customized to display and allow use of the magnifying tool. However, the test-taker may opt to turn off the magnifying tool at any point during the test although he/she is permitted to use the tool. Similarly, the test-taker may opt to turn the magnifying tool back on at any point during the test.

The testing interface 132 may include an interoperability manager 140 for making the accommodation tools provided on the testing interface interoperable. The interoperability manager 140 may ensure that two or more accommodation tools provided on the testing interface 132 operate simultaneously without compatibility issues. The interoperability manager 140 may also prevent certain accommodation tools from being operated simultaneously. The interoperability manager 140 may allow a second set of tools to be activated while a first set is already active. The interoperability manager 140 may further automatically activate or deactivate a first tool in response to the activation or deactivation of a first tool.

The interoperability manager 140 may also automatically detect any potential confusion arising due to the simultaneous use of two or more accommodation tools on the testing interface 132. Potential confusion can arise when the use of a combination of accommodation tools makes the overall presentation of a test-item confusing. In one embodiment, the interoperability manager 140 may automatically deactivate one or more accommodation tools to resolve the confusion, which allows for a less confusing presentation of the test-item. In another embodiment, the interoperability manager 140 may indicate the confusion to the test-taker on the testing interface 132 and suggest deactivating one or more accommodation tools to resolve the confusion.

Exemplary embodiments may also automatically detect and resolve conflicts arising programmatically from the use of two or more accommodation tools.

The testing interface 132 may include a tool use tracker 142 which tracks the use or non-use of each accommodation tool for each individual test-item in the test. For example, the tool use tracker 142 may track the use of a read aloud tool for the first test-item, the non-use of a signing tool for the first test-item, the use of a magnification tool for the second test-item, the non-use of the read aloud tool for the second test-item, etc. In contrast, existing technologies merely indicate whether an accommodation tool was made available for the test as a whole, not at the test-item level. In addition, the tool use tracker 142 may track the use or non-use of each accommodation tool for the test as a whole.

The tool use tracker 142 may be configured to run for the entire duration of the test or during certain portions of the test. The tracker 142 may track whether each permitted tool was used for each test-item, the duration for which each tool was used, etc. The tool use tracker 142 may make the tracked data available after the test is completed. This data may be helpful to teachers in fully assessing the test-taker's performance and the usefulness of the accommodation tools.

The application 120 may include a reporting mechanism 144 for reporting the results of the test taken on the testing interface 132. The reporting mechanism 144 may include a report generator 146 which generates a report using the responses entered by the test-taker and other information, e.g. time taken on each test-item, tool use information, etc. The reporting mechanism 144 may also include a report database 148 for storing reports generated by the report generator 146.

Figure 2:
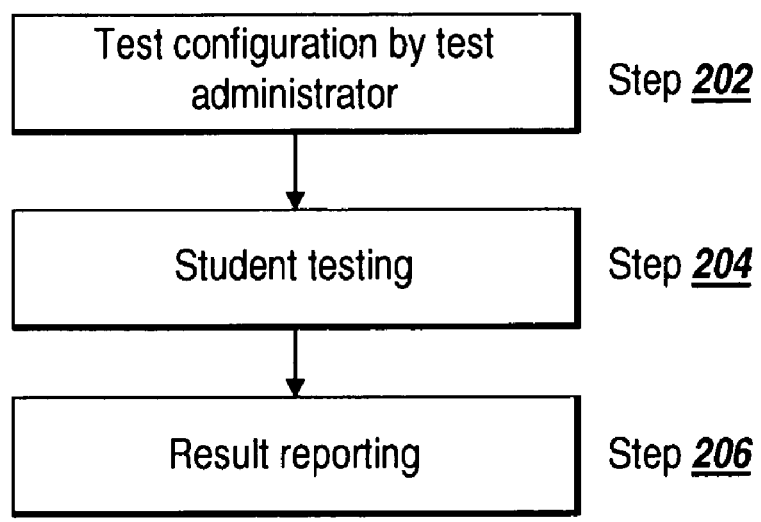
FIG. 2 illustrates a flow chart depicting steps taken in the test accommodation and assessment system in an exemplary embodiment.

FIG. 2 illustrates a flow chart depicting steps taken in the test accommodation and assessment system in exemplary embodiments. In step 202, a test may be configured by a test administrator before the test is taken by a test-taker. Accommodation tools which are permitted for a test-taker may be specified by a test-administrator using the tool manager 126. In step 204, the test-taker may take the test using the testing interface 132. In step 206, results of the test may be reported using the reporting mechanism 144.

Figure 3A:
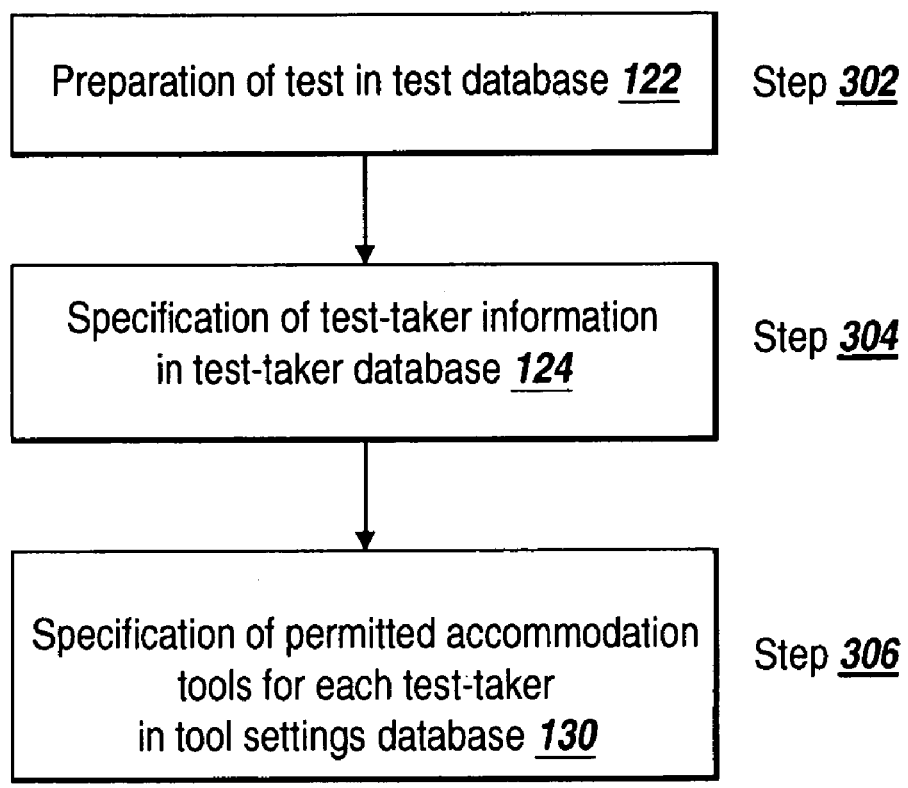
FIG. 3A illustrates a flow chart depicting the steps taken in configuring a test.

As a first step in exemplary embodiments, a test administrator may configure a test to be taken using the testing interface 132. FIG. 3A illustrates a flow chart depicting the steps taken in configuring a test (step 202 in FIG. 2). The test may be provided in the test database 122. In step 302, the teacher may create new test-items or modify existing test-items in the test so that the items work in compliance with the testing interface 132 and the reporting mechanism 144. The test administrator may also set state/regional preferences for the test. The teacher may further specify which tests in the test database 122 include which test-items.

In step 304, the test administrator may specify information about the test-takers in the test-taker database 124. For example, the test administrator may specify the name of a test-taker who will take a test stored in the test database 122, his/her associated state, district, school, teacher, and classroom account, etc.

In step 306, the test administrator may specify permitted accommodation tools that can be used by a test-taker in taking a test. The test administrator may use the tool manager interface 128 provided by the tool manager 126 in providing permissions to zero or more accommodation tools out of all the available tools.

FIG. 3B illustrates an exemplary tool manager interface 128 browser which may be used by a test administrator to set permissions for accommodation tools. The tool manager interface 128 may include an identifier (ID) column 350 for entering the unique ID of a test-taker and a student name column 352 for entering the name of the test-taker taking the test. Settings for different accommodations may be indicated in a read aloud column 354, a reading helpers column 356, a magnification column 358, a stimulus management column 360, an input column 362, and an alternate language column 364. Each of the columns indicating settings for the tools may include two or more sub-columns. The tool manager interface 128 is not limited to the illustrated embodiment, and may include fewer or more settings than those shown. An update column 366 may indicate when the tools were last modified.

The example in FIG. 3B shows permitted tool settings for exemplary test-takers. Tom Hoffmann (ID: 201 as indicated in column 350), for example, is permitted to use a magnifier tool (as indicated in column 358), a custom masking tool (as indicated in column 360), and Signed English/American Sign Language (as indicated in column 364). The mapping of each student to his/her permitted accommodation tools may be stored in the tool settings database 130.

Figure 4A:
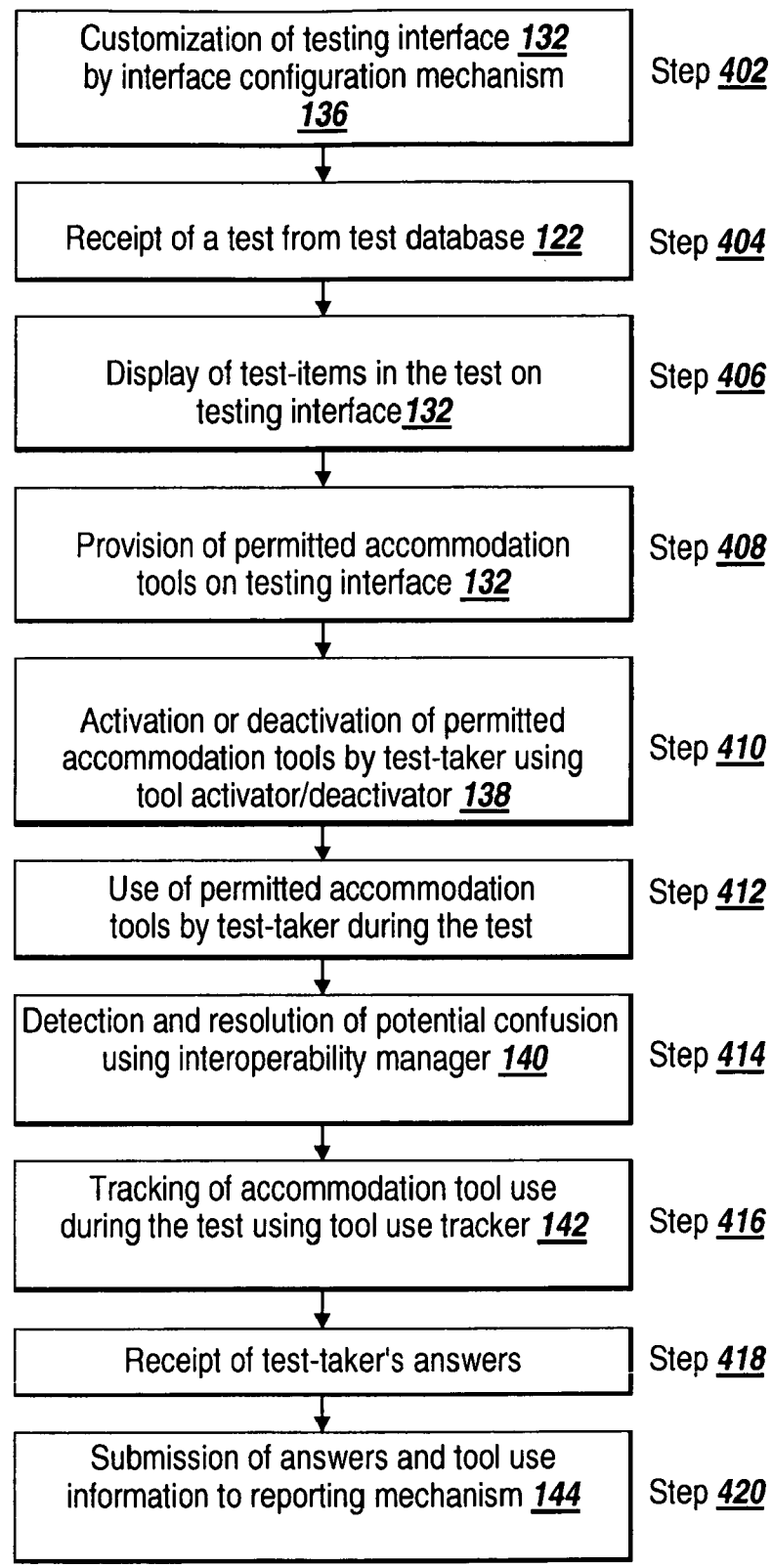
FIG. 4A illustrates a flow chart depicting the steps taken in delivering the test to a test-taker.

After a test is configured and permitted accommodation tools specified, a test-taker may take the test using the testing interface 132. FIG. 4A illustrates a flow chart depicting the steps taken in delivering the test to a test-taker (step 204 in FIG. 2). In step 402, the interface configuration mechanism 136 may customize the testing interface 132 to display and provide access to only the accommodation tools permitted for the current test-taker, as indicated in the tool settings database 130. The permitted tools are built into the customized testing interface.

In step 404, the testing interface 132 may receive a test from the test database 122. In step 406, the test begins and the testing interface 132 may display test-items in the test to enable the test-taker to take the test. In step 408, the testing interface may display and provide access to the permitted accommodation tools if the test-taker chooses to use them. In step 410, the test-taker may opt to deactivate or activate one or more of the permitted accommodation tools using the tool activator/deactivator 138. This step may be performed at the beginning of the test or at any time during the test. In response to deactivation, the testing interface 132 may remove the display of the deactivated tool. In response to activation, the testing interface 132 may return the activated tool to the display.

In step 412, the test-taker may use one or more of the permitted accommodation tools during the test. The accommodation tools are interoperable, and two or more accommodation tools may be used simultaneously. In step 414, the interoperability manager 140 may automatically detect a potential confusion occurring due the use of two or more accommodation tools in the testing interface 132. The interoperability manager 140 may resolve the confusion automatically by, for example, deactivating one or more of the activated tools. Alternatively, the interoperability manager 140 may simply indicate the confusion and a proposed resolution to the confusion, and allow the test-taker to take measures to resolve the confusion.

In step 416, the tool user tracker 142 may track the use or non-use of all the permitted accommodation tools for each individual test-item and for the entire test during the test. Tracked data may be logged and stored until after the test is completed. In step 418, the testing interface 132 may receive answers entered by the test-taker in response to the items in the test. In step 420, before ending the current test, the testing interface 132 may submit the test-taker's answers to the reporting mechanism 144 for preparing a result report.

Figure 4B:
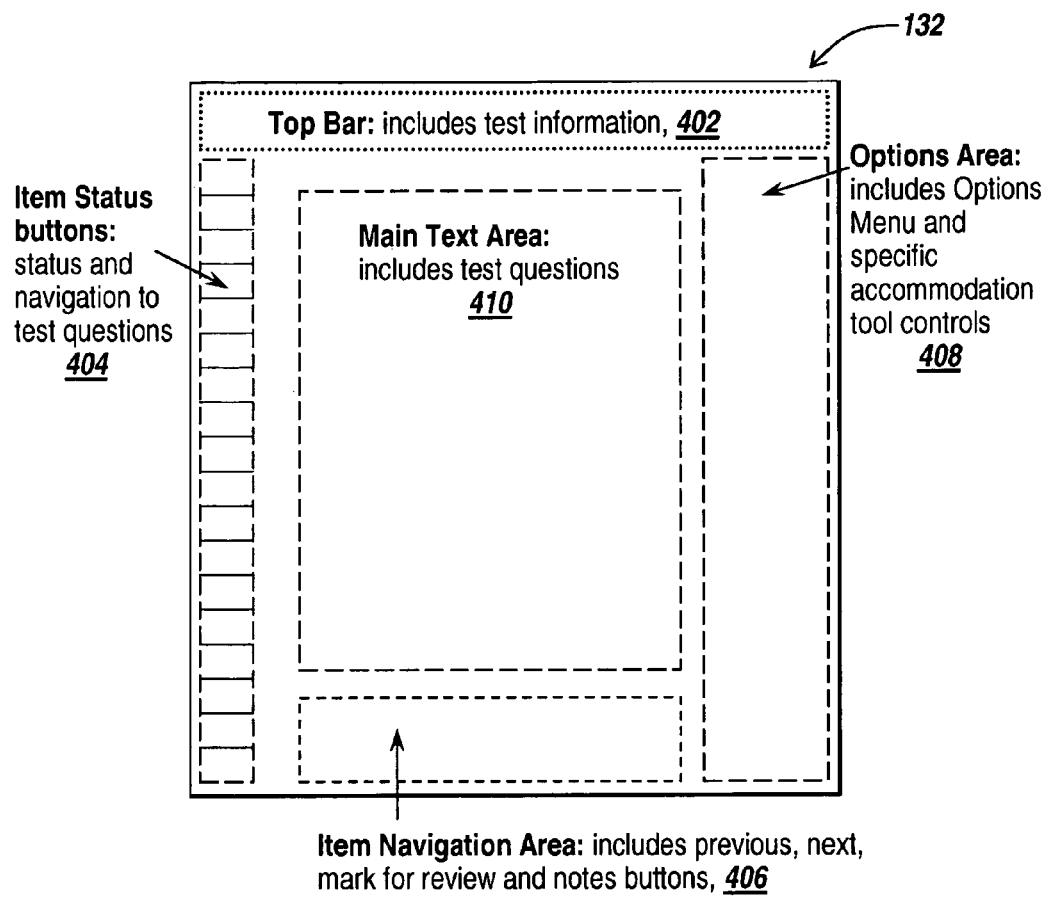
FIG. 4B illustrates an exemplary testing interface for delivering a test with accommodation tools.

FIG. 4B illustrates an exemplary testing interface for delivering a test with accommodation tools. The testing interface 132 may have one or more zones of focus. The exemplary testing interface of FIG. 4B has five zones of focus: a top bar 402, an item status indicator 404, a main text area 410, an item navigation area 406, and an options area 408. The "top bar" 402 may include general information about the test, e.g. the name of the test, the current question number, the name of the current test-taker, etc. The "item status indicator" 404 may reflect the current question number and the state of each question included in the test, e.g. in the form of status buttons. The "item navigation area" 406 may allow the test-taker to navigate to the next question and/or the previous question, mark the current question for later review, and add a personal note pertaining to the current question. Buttons or other affordances may be provided for performing these actions in the "item navigation area."

The "options area" 408 may display and provides access to the permitted accommodation tools. A permitted accommodation tool may be activated by the test-taker in the "options area" 408, e.g. by selecting a menu-item. The "options area" 408 may indicate other tools and resources, e.g. a calculator, available to the test-taker for the current test-item or test. This display may take the form of a menu of tools and resources, but is not limited to this type of display. In one embodiment, the "options area" 408 may always be displayed on the testing interface 132. In another embodiment, the test-taker may opt to hide the "options area" 408 during the test to reduce visual clutter. The test-taker may opt to return a hidden "options area" 408 back on the screen at any time during test.

In one embodiment, the "options area" 408 may be configured to always display the accommodation tools. In another embodiment, the "options area" 408 may be configured so that the test-taker needs to perform an action to display the accommodation tools, e.g. perform a mouse click or hover the mouse over the "options area."

The "main text area" 410 may display test instructions and test-items, and allow entry of the test-taker's responses to the test-items. The "main text area" 410 may also provide access to resource materials as allowed by test administrators, e.g. formulas, the periodic table of elements, glossary terms, etc. In addition, test-items which require measurement may be provided with an on-screen ruler in the "main text area" 410, providing specific measurement increments pertinent to the test-items.

The testing interface 132 may provide a review page that displays information about answered and unanswered test-items and indicates which, if any, test-items the test-taker marked for review in the "item navigation area" 406. The review page may also display any notes taken by the test-taker in the "item navigation area" 406.

The testing interface 132 may include a "finish" option, e.g. a button, for the test-taker to indicate completion of the test. Selecting the finish option indicates that the test-taker wishes to submit his/her answers and exit the current test. If the test-taker is not under an obligation to finish within a specified period of time, the test-taker may save his/her answers for access at a later time. The test-taker may then close the current window of the testing interface 132.

When the test-taker begins taking a test, the interface may display a set of permitted accommodation tools which are not yet activated. The test-taker can activate any and all of the tools, sequentially or simultaneously, during the test. This allows the test-taker a level of control over the appearance and functionality of the testing interface, and does not force the test-taker to any particular set of permitted tools.

Exemplary accommodation tools from a user's perspective are described with respect to FIGS. 5-14 below.

Figure 5:
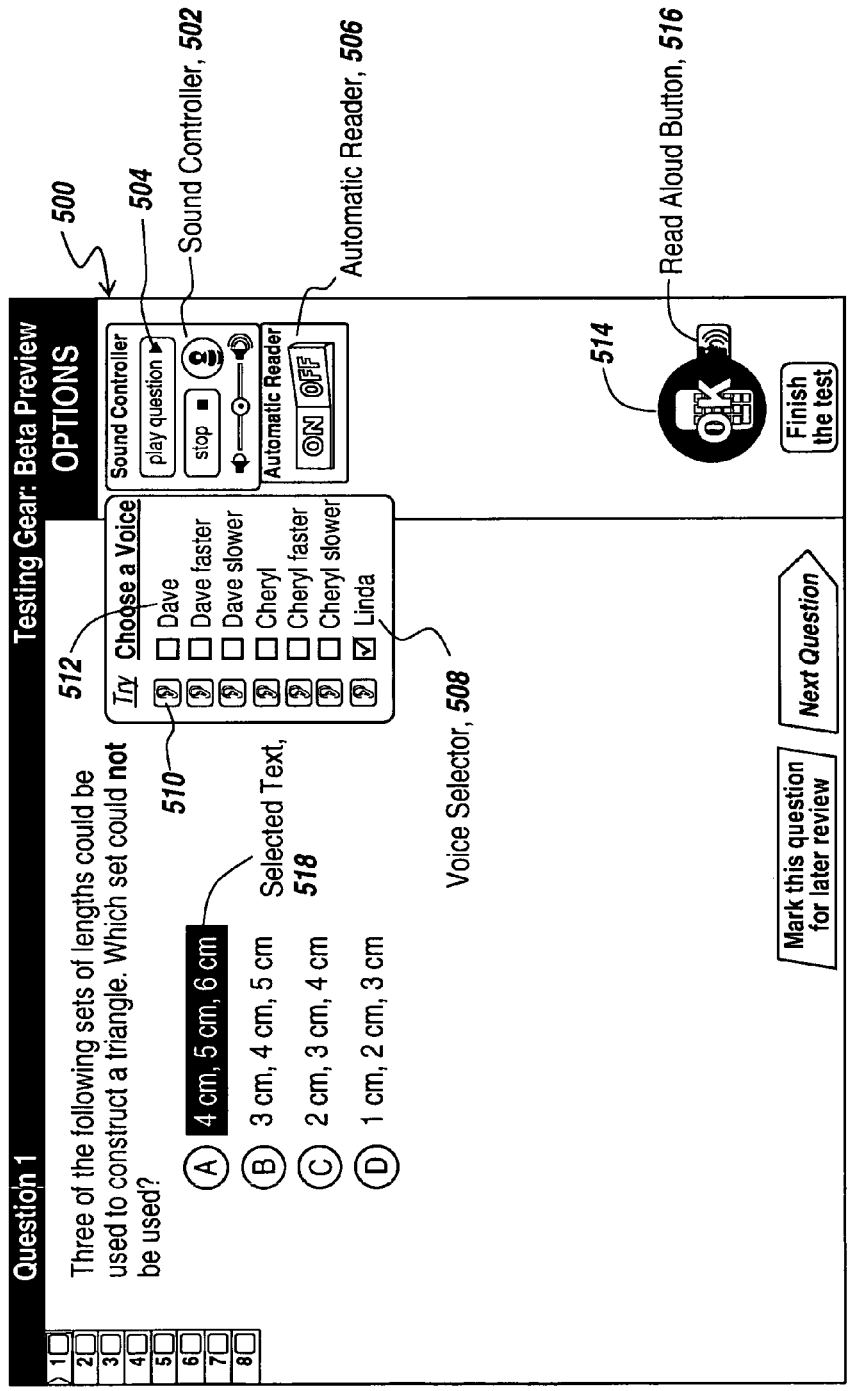
FIG. 5 illustrates an exemplary testing interface with an exemplary read aloud accommodation tool activated on the testing interface.

FIG. 5 illustrates a frame of an exemplary testing interface with an exemplary read aloud tool 500 activated on the testing interface. The read aloud tool is an audio player that reads a portion of text selected by the test-taker or the entire text currently presented on the testing interface. The tool may, for example, include mp3 sound files which contain digital recordings of text used in the test or in the testing interface. The tool may associate the sound files with specific sections of text displayed on the testing interface.

The read aloud tool 500 may include an automatic reader 506 which may be turned on/off, i.e. activated/deactivated, during the test. When the automatic reader 506 is on, the read aloud tool 500 reads the entire test-item presented on the testing interface, without the test-taker having to select a portion of text to be read aloud.

When the automatic reader 506 is off, only a portion of text selected by the test-taker is read aloud. The test-taker may activate the read aloud tool 500 to read a portion of text by a number of options. The read aloud tool 500 may include a sound controller 502 to play/stop the read aloud tool and to control its volume during the test. As a first option, the test-taker may select the "play question" option 504 in the sound controller 502, e.g. by clicking on the option button, to start reading of the test question displayed on the testing interface. As a second option, the test-taker may select a block of text, e.g. text block 518 as illustrated in FIG. 5, to start reading of the selected block. As a third option, the test-taker may use the Tab key on the keyboard to move among text blocks and hit the Enter key to have a highlighted block of text read. As a fourth option, the test-taker may move among text blocks and select a highlighted block using any other input device. The different ways of controlling reading enable test-takers who use a switch mechanism, other assistive communication devices employed by test-takers with physical disabilities, or a touch screen to directly select text to be read, while also enabling test-takers who wish to use a mouse to select text for reading.

The tool may include a voice selector 508 which presents an option of different voices. The options may include any number of male/female voices (e.g. Dave and Cheryl as shown in FIG. 5), human/synthesized voices, fast/medium/slow voices, etc. The testing interface may be configured to provide fewer or more voice options in the voice selector 508. The test-taker may choose one voice from the options in the voice selector 508, e.g. by ticking an option box. In some embodiments, a test administrator may set the voice selection 508 so that only a certain voice or a certain type of voice (e.g. human as opposed to synthesized) is allowed for all test-takers. This level of control by the test administrator allows for various levels of standardization of the accommodation across all test-takers.

For each voice, the voice selector 508 may allow the test-taker to hear a sample of the voice before selecting it. For example, sample play option 510 may be used to hear a sample of the voice "Dave" 512 before selecting "Dave."

As a block of text is read aloud, it is highlighted on the testing interface. The test-taker may opt to have the entire test-item or any block of text read aloud as many times as he/she wishes. The test-taker may stop the reading at any time either by selecting a "stop" option on the sound controller 502 or by pressing the Spacebar or other designated key on the keyboard.

The read aloud tool 500 may also allow the test-taker to read a portion of the testing interface that is not a test-item, i.e. a portion outside the "main text area," such as a navigation button. The test-taker may do so by placing the mouse or any other input device pointer over the portion he/she wishes to be read. In response, the testing interface may display a hidden pop-up option on or near the indicated portion of the interface. The test-taker may select the pop-up option to read the text on the indicated portion of the interface. For example, the test-taker may read the text displayed on a navigation button 514 by selecting the pop-up option 516 displayed adjacent to the button. To reduce the activity on the testing interface, the read aloud tool 500 may be configured so that the pop-out options, e.g. 516, do not pop out. In addition, the read aloud tool 500 may be configured so that all interactive objects have their names and descriptions read out when the objects are selected using the keyboard or any other input device.

For test-takers who are blind or have a visual impairment, the read aloud tool 500 may be configured to automatically read all text and object descriptions. Additionally, the testing interface may be configured to include alternate descriptions of visual objects, e.g. illustrations, graphics, tables, charts, and the read aloud tool 500 may be configured to automatically read these alternate descriptions. The alternate descriptions may be excluded from the testing interface and the read aloud tool 500 for non-blind test-takers.

The read aloud tool 500 is interoperable with all the other accommodation tools provided in the testing interface, e.g. the magnification tool, auditory calming tool, reverse contrast tool, color overlay tool, and masking tools. The sound on the test-taker's computer is turned on while the read aloud tool 500 is used. The read aloud tool may be used with or without headphones provided to the test-taker.

Test-takers with weak or low vision often require text to be presented in a larger-than-normal font size. To meet this need, multiple versions of test booklets are generated and distributed for state testing programs. Alternatively, the font size for computer-based tests are modified as needed. Doing so with existing technologies, however, often alters the layout of the test-items, misplaces graphic labels, and frequently changes the word wrapping of text.

Figure 6A:
FIG. 6A illustrates an exemplary magnification tool which magnifies a portion of the testing interface selected by the test-taker.

Exemplary embodiments employ one or more methods of magnification to enlarge text and/or images, do not alter the layout of the test-items, and assist test-takers in accessing text that may appear off-screen. FIG. 6A illustrates an exemplary magnification tool 600 which magnifies a portion of the testing interface selected by the test-taker.

The magnification tool includes a viewing area 602. The test-taker may move a pointer of a mouse or any other input device to indicate any part of the testing interface that needs to be magnified. The test-taker may also use the Tab key on the keyboard to navigate to text or interactive objects on the testing interface. In response, the magnification tool may magnify the indicated part of the testing interface or the indicated text or interactive objects, and display the magnified part in the viewing area 602. The magnification tool may include a magnification adjustor 604, e.g. in the form of a sliding scale, which allows the test-taker to increase or decrease the amount of magnification.

Figure 6B:
FIG. 6B illustrates an exemplary microscope tool which is designed for test-takers with severe visual impairment.

The magnification tool may not, however, be an optimal solution for test-takers with severe visual impairment, because these test-takers typically scan the screen using head motion rather than eye motion. It is thus desirable to move text and images into the area on which the test-taker is already focused. FIG. 6B illustrates an exemplary microscope tool 610 which is designed for such test-takers with severe visual impairment. Using the microscope tool 610, the test-taker may move a pointer of a mouse or any other input device to any part of the testing interface. The test-taker may also use the Tab key on the keyboard to navigate to text or interactive objects on the testing interface. The microscope tool 610 may magnify the indicated part of the testing interface or the indicated text or objects, and center the magnified part around a fixed point on the screen. The test-taker may shift the fixed point on the screen around which magnified areas are centered. The microscope tool 610 may allow the test-taker to adjust the amount of magnification applied by the microscope tool, e.g. using a sliding scale.

FIG. 6C illustrates an exemplary enlarger tool 620 designed for test-takers who may benefit from having only the test-item enlarged on the testing interface. The enlarger tool may allow for a larger viewing area 622 for displaying the test-item. The tool may magnify the test-item and display it in the viewing area 622. The rest of the testing interface is not magnified. The borders of the viewing area 622 may include arrows 624 which are displayed if content exists outside the viewing area 622.

The test-taker may access content outside the viewing area 622 by one or more methods. In one option, the test-taker may select an arrow pointing in the direction of the desired content, e.g. by a mouse-click on the arrow. In another option, the test-taker may move the content in the viewing area 622 up, down, left or right by using an input device, e.g. using keyboard arrow keys. In still another option, the test-taker may drag the desired content into the viewing area 622, e.g. by pressing a controlling keyboard key and by pressing and holding down the mouse button.

The magnification tools illustrated in FIGS. 6A, 6B and 6C may be activated or deactivated by the test-taker at any time during the test. The testing interface may manage the use of the magnification tools by limiting the test-taker to only one magnification method at a time since using multiple magnification views can become confusing.

The magnification tools are interoperable with the other accommodation tools provided on the testing interface, but may be prevented from working with the masking tools as magnification tools may already limit the visual area the test-taker can see. For example, when the read aloud tool is activated, a magnified version of the text being read is indicated in the magnified view.

Figure 7:
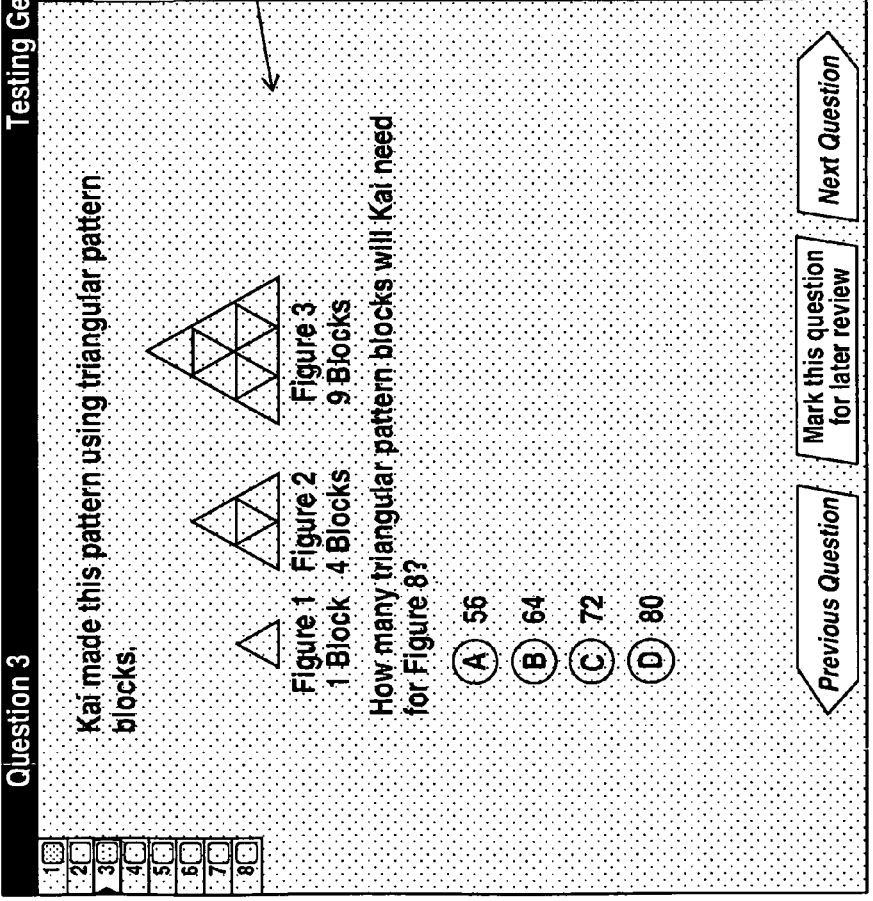
FIG. 7 illustrates an exemplary testing interface with an exemplary color overlay accommodation tool activated on the testing interface.

FIG. 7 illustrates a frame of an exemplary testing interface with an exemplary color overlay tool 700 activated on the testing interface. A color overlay is a colored transparency placed over paper. The color overlay tool 700 acts as a colored filter that allows the test-taker to better see text and images displayed on the testing interface. For example, the color overlay tool 700 may place a color overlay over a test-item, allowing the student to look at the test-item through a colored filter. The color overlay may change the color of the entire content area of the testing interface, including graphics and answer areas. Alternatively, the color overlay may change the color of only an indicated area of the testing interface.

The color overlay tool 700 may provide several overlay color options 702, e.g. yellow, pink, green, blue, or clear overlays, as illustrated in FIG. 7. The test-taker has the option of turning the color overlay tool 700 on or off at any time, and may change the overlay color at any time. The overlay option may also be specified by the test-taker and/or a test administrator prior to testing. This option is useful for test-takers who may become distracted by more than one color option.

The color overlay tool 700 is interoperable with the other accommodation tools provided on the testing interface, except the color chooser tool. The interoperability manager 140 may detect potential confusion when the test-taker attempts to activate the color overlay tool with the color chooser tool. The interoperability manager 140 may prevent the color chooser tool from being activated at the same time as the color overlay tool, and vice versa. If both the tools are activated, the interoperability manager 140 may automatically turn one tool off to resolve the confusion. Alternatively, the interoperability manager 140 may recommend that the test-taker turn one of the tools off in order to use the other tool.

Figure 8:
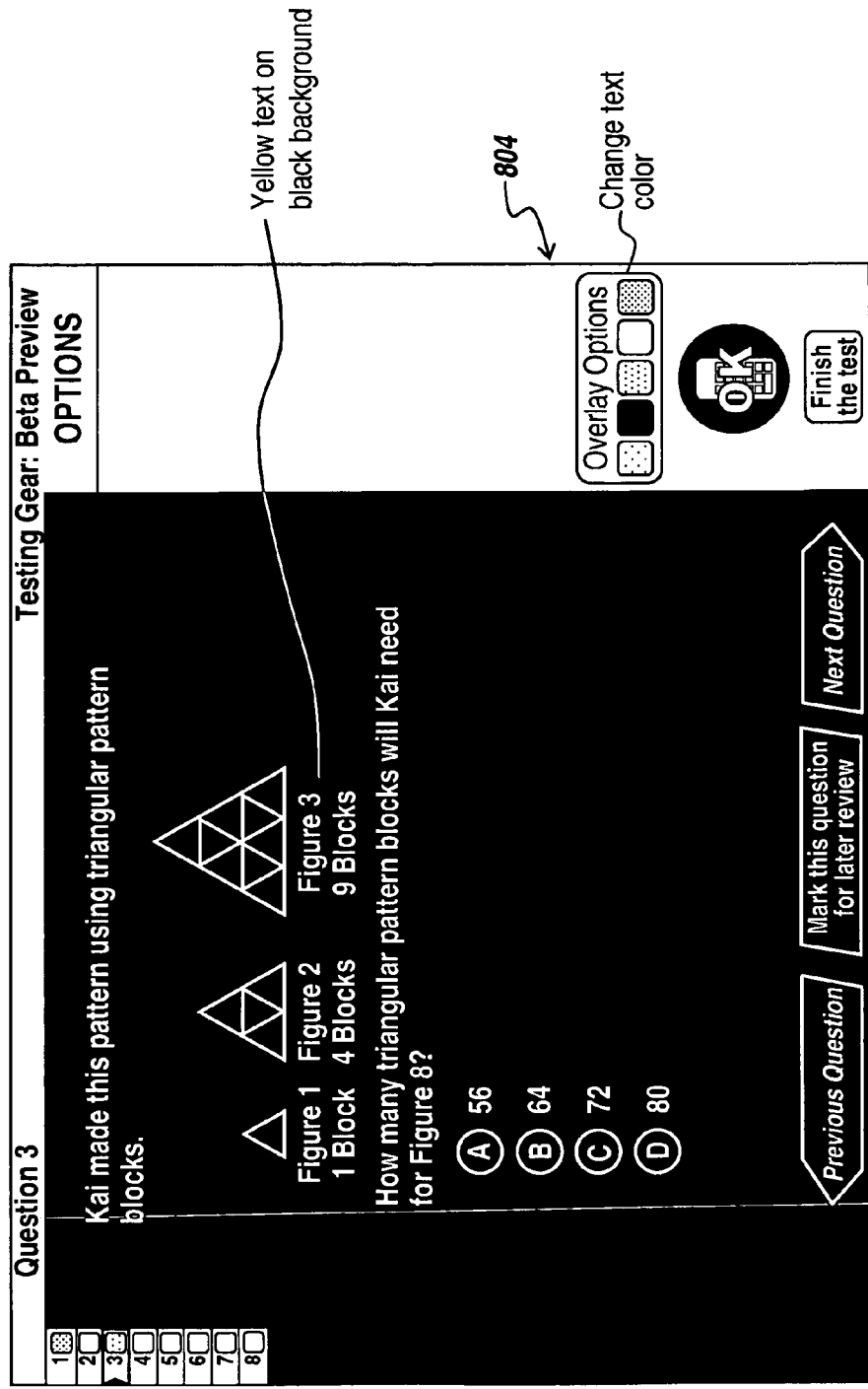
FIG. 8 illustrates an exemplary testing interface with an exemplary reverse contrast accommodation tool activated on the testing interface.

FIG. 8 illustrates a frame of an exemplary testing interface with an exemplary reverse contrast tool activated on the testing interface. Typically, high contrast displays present text and images in yellow on a black background. For some test-takers, however, the preferred text and images are pink, bright blue, bright green or white on a black background.

To accommodate such test-takers, the reverse contrast tool 800 may display all portions of a test-item on a black background 802 and provide a choice of color overlay options 804. In one embodiment, the interoperability manager 140 may activate the color overlay tool 700 when the reverse contrast tool 800 is activated to provide the color overlay options 804. The overlay options 804 may allow the test-taker to select the color of the text and images displayed on the screen. The test-taker may turn the reverse contrast tool on or off at any time and may change the overlay color at any time. The reverse contrast tool may change the colors and values of the entire interface, with the exception of the overlay options 804 which shows the actual colors that may be chosen to tint the content area. Alternatively, the reverse contrast tool may change the colors and values of an indicated area of the testing interface.

The reverse contrast tool is interoperable with all other accommodation tools, except the color chooser tool. The interoperability manager 140 may detect potential confusion when the test-taker attempts to activate the reverse contrast tool with the color chooser tool. The interoperability manager 140 may prevent the reverse contrast tool from being activated at the same time as the color chooser tool, and vice versa. If both the tools are activated, the interoperability manager 140 may automatically turn one tool off to resolve the confusion. Alternatively, the interoperability manager 140 may recommend that the test-taker turn one of the tools off in order to use the other tool.

Figure 9:
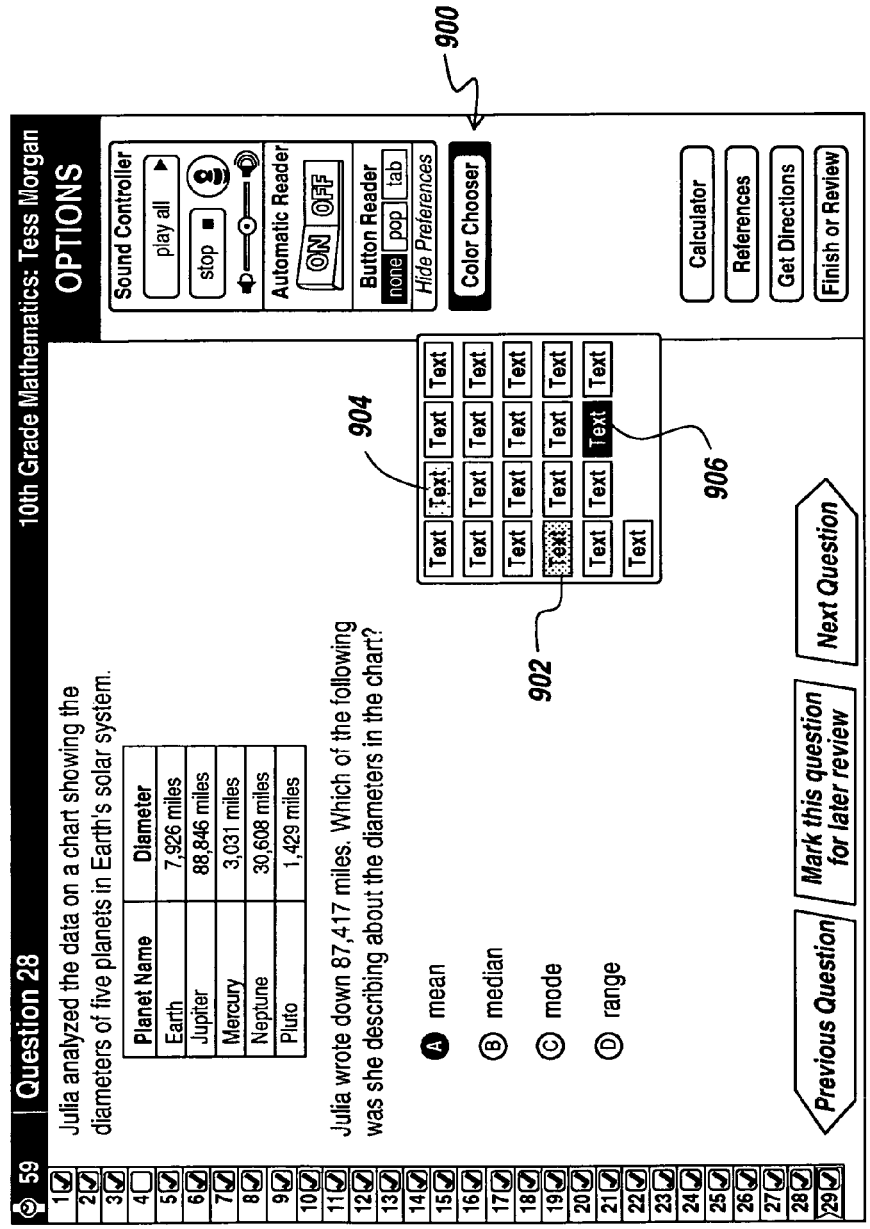
FIG. 9 illustrates an exemplary testing interface with an exemplary color chooser accommodation tool activated on the testing interface.

FIG. 9 illustrates a frame of an exemplary testing interface with an exemplary color chooser tool 900 activated on the testing interface. A test-taker may prefer to have the ability to change the color of the test background and font of the testing interface. The color chooser tool 900 allows test-takers to choose background/font color combinations that have been proven effective for many groups of test-takers. The color chooser tool 900 may provide a number of swatches, e.g. 902, 904, 906, which show different colored backgrounds paired with different colored fonts. The test-taker may select a combination of the swatches. In response to a selection, the color chooser tool 900 may change the color of the test background and the font used in the test-items. However, in one embodiment, the color chooser tool 900 may not alter the colors of lines or fills of tables, charts, graphics, or illustrations presented in the question.

The color chooser tool is interoperable with the other accommodation tools provided on the testing interface, except for the reverse contrast tool and the color overlay tool. The interoperability manager 140 may detect potential confusion when the test-taker attempts to activate the color chooser tool with the reverse contrast tool or the color overlay tool. The interoperability manager 140 may prevent the color chooser tool from being activated at the same time as the reverse contrast tool or the color overlay tool, and vice versa. If both the color chooser tool and reverse contrast tool/color overlay tool are activated, the interoperability manager 140 may automatically turn one tool off to resolve the confusion. Alternatively, the interoperability manager 140 may recommend that the test-taker turn one of the tools off in order to use the other tool.

Figure 10:
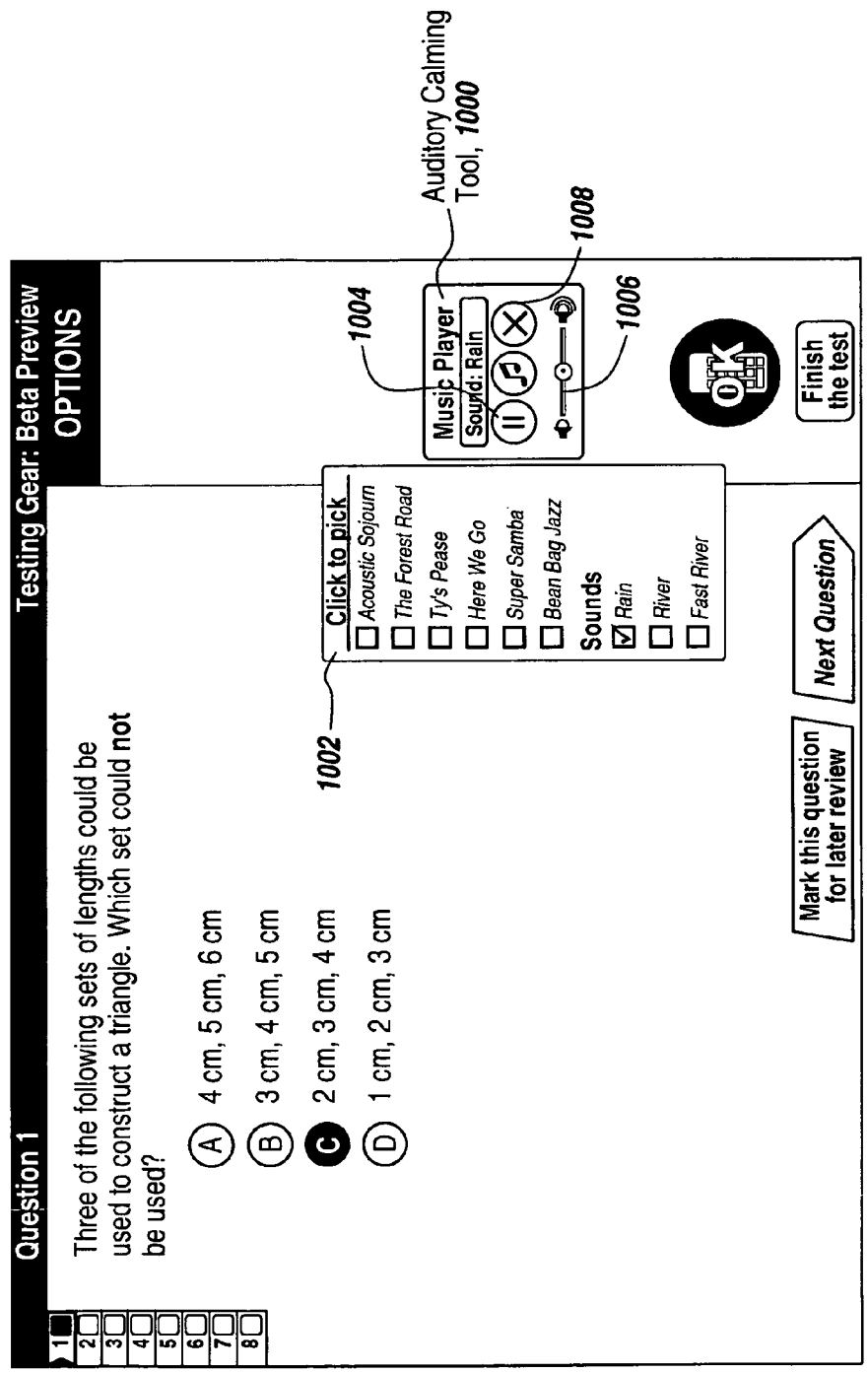
FIG. 10 illustrates an exemplary testing interface with an exemplary auditory calming accommodation tool activated on the testing interface.

FIG. 10 illustrates a frame of an exemplary testing interface with an exemplary auditory calming tool 1000 activated on the testing interface. The auditory calming tool 1000 may be an audio player which plays an audio file during the test to calm or soothe the test-taker.

The auditory calming tool may include a sound selection option 1002 which displays a selection of available music or sounds. The test-taker may make a selection or change a selection to be used by the auditory calming tool at any time during the test. The test-taker may pause or play the audio using the pause/play option 1004, and change the volume of the audio using the volume adjustor 1006. Finally, the test-taker may close the auditory calming tool 1000 by using the close option 1008. The auditory calming tool 1000 may be configured to loop a selected file continuously, play a selected file only once, or stream audio from a pre-selected station.

The auditory calming tool 1000 is interoperable with the other accommodation tools provided on the testing interface 132. However, potential confusion may arise when the auditory calming tool 1000 is used in conjunction with the read aloud tool. The interoperability manager 140 may automatically detect potential confusion when the test-taker attempts to activate the auditory calming tool 1000 with the read aloud 500 tool. If both the auditory calming tool and the read aloud tool are activated, the interoperability manager 140 may automatically detect the simultaneous use and resolve the confusion by stopping playing the auditory calming tool while text is read aloud and then resuming when reading is complete. Alternatively, the interoperability manager 140 may decrease the volume of the auditory calming tool when text is read aloud and then resume the volume when reading is complete.

In addition, for test-takers who have the read aloud tool enabled, the auditory calming tool may be configured to either stop playing while text is read aloud and then resume when reading is complete, or to decrease the volume of the auditory calming tool while text is read aloud and then resume the volume when reading is complete.

Test-takers with attention disorders may need to isolate or mask certain portions of a test-item or the testing interface to increase their ability to concentrate on the test-item. For example, such test-takers may want information that is not of immediate interest to be blocked or masked. In a testing situation, masking involves covering one or more portions of the testing interface that the student is not currently working on. For paper-based tests, this can be accomplished by covering information that is not of immediate interest with paper.

The testing interface of exemplary embodiments may include masking tools that provide masking of one or more portions of the testing interface. A "mask" may be an opaque patch which hides the portion of the interface on which it is applied.

Figures 11A, 11B:
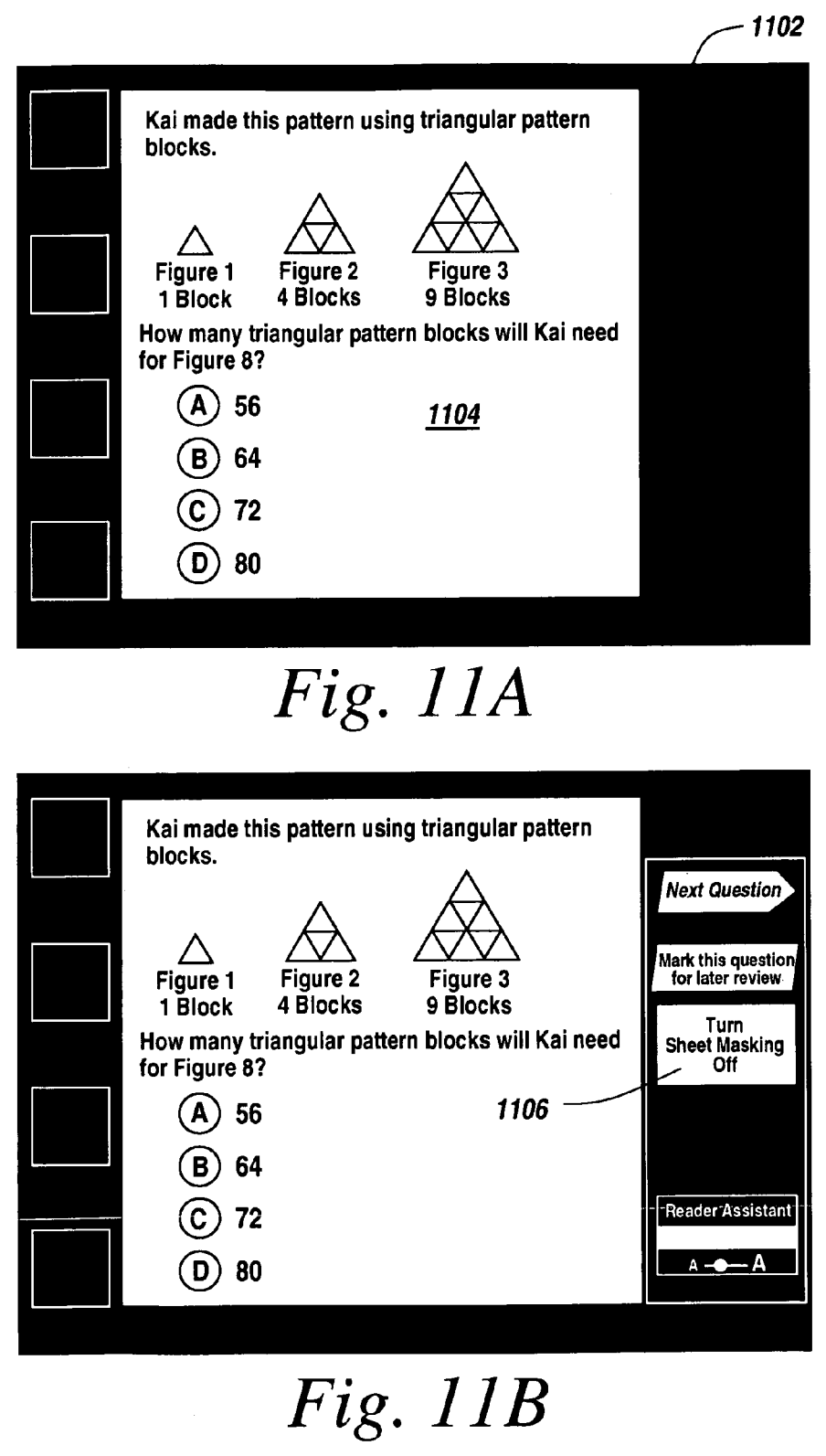

The testing interface may include a test-item masking tool 1100 as illustrated in FIGS. 11A and 11B, which enables a test-taker to focus his/her attention directly on the test-item. The test-item masking tool masks all parts of the testing interface other than the test-item itself. The tool will thus mask all buttons and menu options. As shown in FIG. 11A, the test-item masking tool applies a sheet of masking 1102 to all portions of the testing interface other than the test-item 1104.

To access a menu option or control button, the test-taker may indicate the "options area" of the testing interface with an input device, e.g. by hovering the mouse cursor over the options area. In response, the test-item masking tool may reveal a sheet masking on/off option 1106. The test-taker may select the on/off option 1106 to remove the masking 1102. Once the masking is removed, the test-taker may select the option 1106 again to reapply the masking 1102.

Figure 11C:
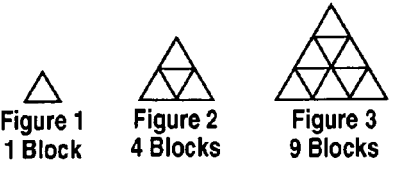
FIG. 11C illustrates an exemplary answer masking tool.

Some test-takers become distracted and have difficulty focusing on test-items when the stem (question portion) and the options (answer portion) are presented together, e.g. in multiple-choice questions. To accommodate such test-takers, the testing interface may include an exemplary answer masking tool 1120 as illustrated in FIG. 11C.

The answer masking tool may cover the answers while the test-taker reads a question. The answer masking tool may include an option 1122 which the test-taker can select to reveal all the answers at once. The tool may also include separate reveal/mask options 1124a-d, e.g. in the form of buttons, for each corresponding answer option. The test-taker may select the reveal/mask options 1124a-d to selectively reveal or mask each answer option. For example, when an answer option is masked, the test-taker may select the reveal/mask option corresponding to the answer option to reveal the answer option. When an answer option is revealed, the test-taker may select the same reveal/mask option to re-mask the answer option. In the example depicted in FIG. 11C, the test-taker has selectively masked the answer option B by a mask 1126, while leaving the other answer options A, C and D revealed.

Figure 11D:
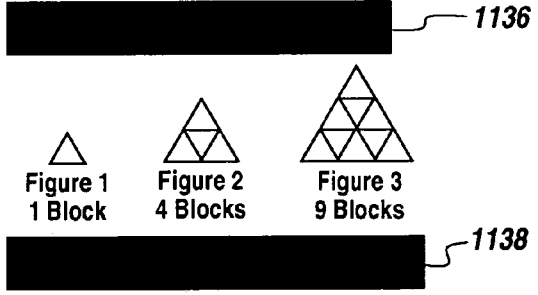
FIG. 11D illustrates a custom masking tool which allows simultaneous masking of different portions of the testing interface.

The testing interface may also include a custom masking tool 1130 as illustrated in FIG. 11D to allow simultaneous masking of different portions of the testing interface. A test-taker may, for example, hide diagrams and tables while reading text, and may then hide text while studying the diagrams and tables. The custom masking tool may include an option 1132 to mask the whole test-item. The custom masking tool may also include a new masking sheet option 1134 which allows the test-taker to click and drag a new piece of masking over a desired part of the testing interface. After a piece of masking has been applied, the test-taker may move the masking around the testing interface. The test-taker may also resize the piece of masking to mask different parts of a test-item as needed. In the example depicted in FIG. 11D, the test-taker has selectively masked the question portion of a test-item 1136 and the preamble to the answer portions 1138.

The exemplary masking tools illustrated in FIGS. 11A-D are interoperable with all other accommodation tools provided on the testing interface, except for the magnification tools because magnification tools may already provide a physical "mask" by reducing the field of vision. The interoperability manager 140 may detect potential confusion when the test-taker attempts to activate the magnification tool with the masking tool. The interoperability manager 140 may prevent the magnification tool from being activated at the same time as the masking tool, and vice versa. If both the magnification tool and masking tool are activated, the interoperability manager 140 may automatically turn one tool off to resolve the confusion. Alternatively, the interoperability manager 140 may recommend that the test-taker turn one of the tools off.

Figure 12A:
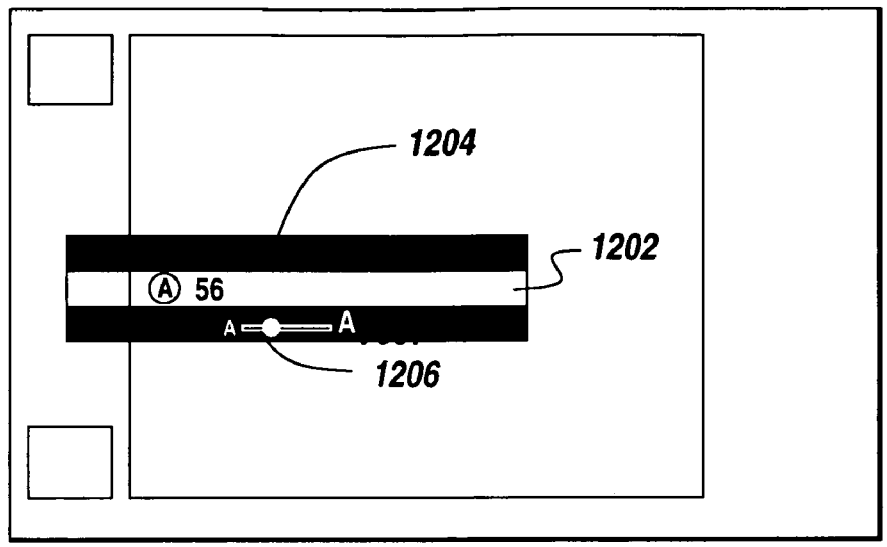
FIGS. 12A and 12B illustrate a reading assistant tool.
Figure 12B:
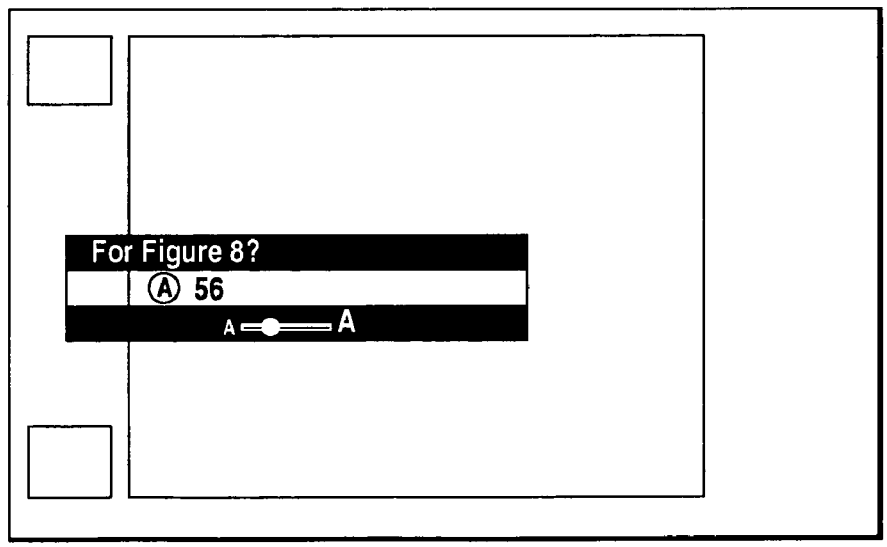

The testing interface of exemplary embodiments may include a reading assistant tool 1200 which provides yet another type of masking as illustrated in FIGS. 12A and 12B. The reading assistant tool may provide a lens 1202 through which text and images are visible in a focus area. The reading assistant tool may provide a frame 1204 surrounding the lens 1202 which hides text and images lying outside the lens 1202. Thus, the reading assistant tool may mask or hide everything on the screen except for the text and/or images displayed within the lens 1202.

The test-taker may move the reading assistant tool around in the testing interface, e.g. by using the arrow keys on the keyboard or by dragging using a mouse. The test-taker may resize the lens 1202 and adjust the amount of magnification using the magnification adjuster 1206, which may be in the form of a sliding scale. The test-taker may also place a color overlay within the frame of the reading assistant tool. Together, these options may allow the test-taker to focus on only one or two lines at a time with magnification and/or a color overlay, as illustrated in FIG. 12A. The test-taker may also alter the transparency of the frame 1204 of the reading assistant tool. A transparent frame 1204 allows the test-taker to see through the frame so that he/she knows whether text or images exist above or below the frame. FIG. 12B illustrates an exemplary reading assistant tool with a transparent frame 1204.

The reading assistant tool is interoperable with the other accommodation tools provided by the testing interface. When used together with the read aloud tool, the reading assistant automatically moves to the block of text that is being read in order to help the test-taker focus on the text as it is read.

The National Association for the Deaf advocates providing appropriate accommodations for hearing-impaired test-takers with poor reading skills. Signing of text may be provide for items that require the application of reading skills, but are not intended to provide measures of reading performance. Since hearing-impaired test-takers do not have access to a read aloud accommodation for test-items, they are provided a similar accommodation through signing of the test-items.

Conventionally, a teacher or test proctor sits with the test-taker during the test, and either signs all text or signs text as requested by the student. Like the standard read aloud accommodation, signing of text results in inconsistencies in the way mathematical expressions and other information is presented to students. For example, if one interpreter signs the test in a highly skilled manner and another has less skill in signing, then the test-takers who receive the first test has a significant advantage over those in the second group.

Figure 13:
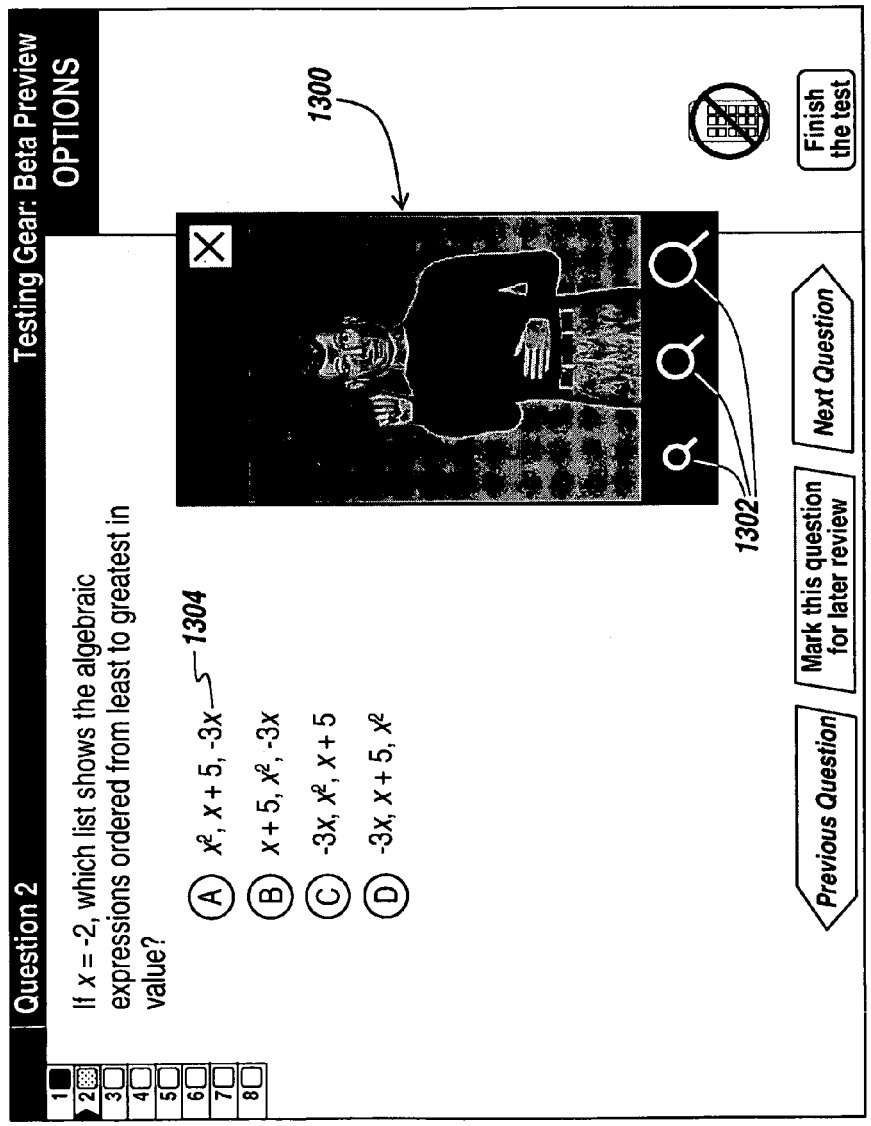
FIG. 13 illustrates an exemplary testing interface with an exemplary signing accommodation tool activated on the testing interface.

To address this problem, the testing interface of exemplary embodiments provides a signing tool 1300 for deaf and hearing-impaired test-takers who are eligible for a read aloud accommodation. FIG. 13 illustrates a frame of an exemplary testing interface with an exemplary signing tool 1300 activated on the testing interface. The signing tool 1300 may be a visual display that presents test-items in a sign language to aid hearing-impaired test-takers. The signing tool 1300 may be a video recording of a human signer or a signing avatar, signing in American Sign Language or Signed English. Signing avatars are popular tools for providing students with access to textual material in a low-cost manner.

The video may be displayed in a moveable window beside the test-item being signed, and the test-taker may move the window around in the testing interface. The signing tool 1300 may have controls for playing and pausing the video, and for changing the size of the video 1302.

In one embodiment, the signing tool 1300 may read the entire text of the test-item displayed on the testing interface. In another embodiment, the test-taker may select a portion of the test-item, e.g. multiple-choice answer option 1304, and invoke the signing tool 1300 to sign only that portion.

The signing tool 1300 is interoperable with all other accommodation tools, except the read aloud tool. The interoperability manager 140 may detect potential confusion when the test-taker attempts to activate the signing tool with the read aloud tool. If desired, the interoperability manager 140 may be configured to allow simultaneous use of the read aloud tool 500 and the signing tool 1300 to accommodate users who may have some hearing. Alternatively, the interoperability manager 140 may be configured to not allow simultaneous use of the read aloud and signing tools. In the latter case, the interoperability manager 140 may prevent the signing tool from being activated at the same time as the read aloud tool, and vice versa. If both the signing tool and the read aloud tool are activated, the interoperability manager 140 may automatically turn one tool off to resolve the confusion. Alternatively, the interoperability manager 140 may recommend that the test-taker turn one of the tools off.

Figure 14:
FIG. 14 illustrates an exemplary testing interface with an exemplary alternate language tool, Spanish in this case, activated on the testing interface.

FIG. 14 illustrates a frame of an exemplary testing interface with an exemplary alternate language tool 1400, Spanish in this case, activated on the testing interface. The alternate language tool may display a portion of or the entire testing interface in a language other than English to accommodate test-takers who need to have test-items translated to their native language. This accommodation may be allowed for tests that are not designed to specifically measure reading skills. Enabling items, such as mathematical word problems, to be translated to a test-taker's native language decreases the impact that the construct of reading in English has on the measure of the test-taker's mathematics ability.

Conventionally, this accommodation is provided by either producing a paper copy of the test booklet presented in the test-taker's native language or by having a test proctor sit with the test-taker and speak aloud his/her translation of the test. Given the cost of producing paper copies of tests in an alternate language, this option is often provided for only those languages spoken by a large number of test-takers, e.g. Spanish. The alternative of having a proctor translate the test for the student places demands on schools to provide additional test proctors and often results in unstandardized translations.

To address these shortcomings, the testing interface of exemplary embodiments provides an alternate language tool to present test-items and/or the testing interface in an alternate language and to be read aloud in an alternate language. The alternate language tool may be activated by the test-taker in the "options area" 408, e.g. by selecting a menu-item. In one embodiment, the tool may be activated to translate the entire testing interface including buttons and directions, as illustrated in FIG. 14. In another embodiment, the tool may be activated to translate only the test-items presented on the testing interface, and/or on a test-item basis. The tool may also be deactivated in the "options area" 408 to return the display to the English version.

In addition to translating the visual display to an alternate language, the alternate language tool may provide a read aloud version of the test-items in the alternate language. In one embodiment, the visual display and read aloud may be activated only in the same language. For example, the read aloud tool may read a test-item in English when the English version of the item is displayed on the screen, and read the test-item in the alternate language when the alternate language version of the item is displayed. The alternate language tool is interoperable with all other accessibility and accommodation tools.

The testing interface of exemplary embodiments may provide a Braille display tool for visually impaired test-takers. The testing interface may be able to work in conjunction with a screen reader software, e.g. JAWS®, and electronic Braille displays to allow all text associated with a test-item to be presented in Braille on an electronic Braille display. The text may be exposed to the screen reader using methods built into Actionscript 3.0, the language of Shockwave Flash.

The testing interface of exemplary embodiments may be navigated using Tab/Enter keys on the keyboard. In addition, all controls and accessibility and accommodation tools may be Tab/Enter enabled. A test-taker may navigate to any interactive item or text by Tabbing through the objects. The test-taker may press Enter when an item or object is in focus to activate the item or object. Because the interface is Tab/Enter enabled, input devices known as switches may be set to use Tab and Enter keys, enabling test-takers with muscular control problems to more easily access the content and controls of the test.

In one embodiment, the testing interface reads all objects and text when the test-taker Tabs to the read aloud tool. This mode is intended for use by test-takers who use an assistive communication device and who have low or no vision.

The testing interface of exemplary embodiments may include any number of additional accommodation tools, e.g. scaffolding, motivational support, attention stimulation, and structured test-taking support. These additional tools may be provided with or without an avatar. An avatar accompanying an accommodation tool may be standardized across all test-takers or customized for each test-taker.

Figure 15:
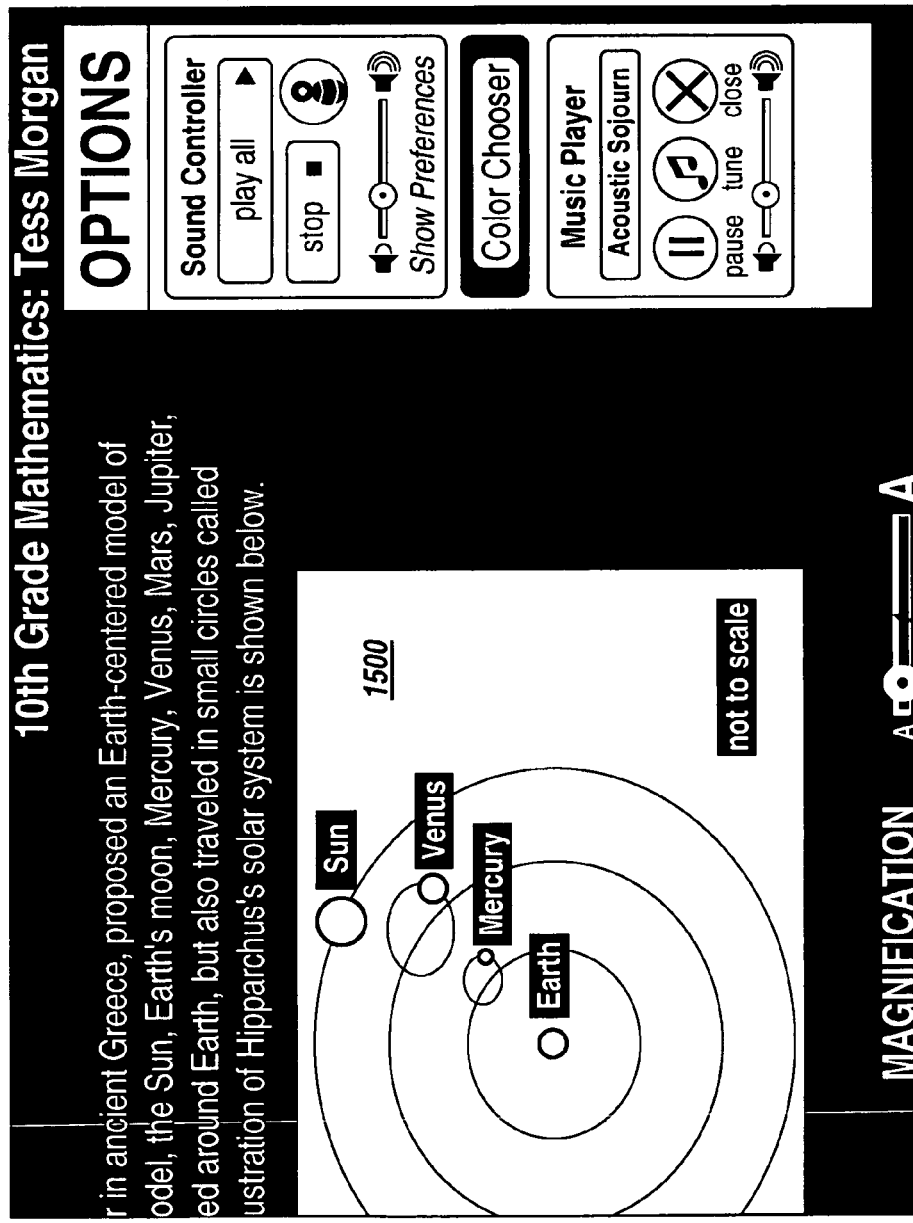
FIG. 15 illustrates an exemplary testing interface with multiple exemplary accommodation tools activated on the testing interface.

FIG. 15 illustrates a frame of an exemplary testing interface with multiple exemplary accommodation tools simultaneously activated on the testing interface: a read aloud tool 500, a color chooser tool 900, an auditory calming tool 1000, and a magnification tool 600. The accommodation tools are programmatically built into the interface, and are not provided by external software, tools or application.

Because the accommodation tools are built into the testing interface, the different accommodation tools may be provided on the testing interface in a pre-defined and organized manner such that the test-taker's view of the test-items is not cluttered or blocked out. For example, tools 500, 900 and 1000 are displayed in a highly ordered manner in the "options area" panel to the right of the "main text area" of the interface. Similarly, tool 600 is displayed under the "main text area" of the interface. As such, the accommodation tools leave the test-taker's view of the "main text area" 1500, displaying the test-item, unblocked.

The accommodation tools may be interoperable. The different tools may operate simultaneously without compatibility issues. Potential confusion arising from the simultaneous use of two or more tools may be automatically detected and resolved. In addition, the tools may be activated in any order during the test, i.e. a second set of tools may be activated while a first set of tools is already active.

Figure 16:
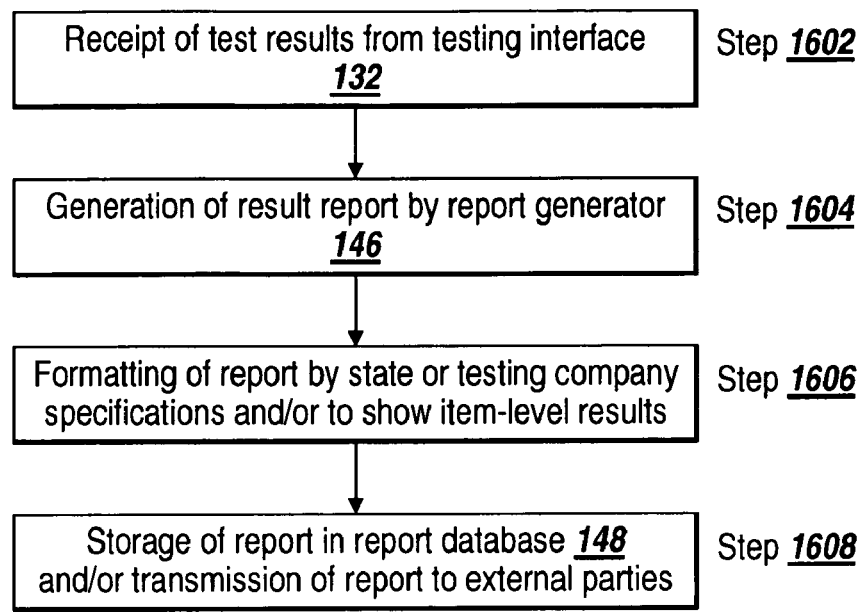
FIG. 16 illustrates a flow chart depicting the steps taken by the reporting mechanism in reporting test results.

After a test is completed, the results of the test may be reported. FIG. 16 illustrates a flow chart depicting the steps taken by the reporting mechanism 144 in reporting test results (step 206 in FIG. 2). In step 1602, the reporting mechanism 144 may receive one or more results of the test from the testing interface 132. The results may include an overall grade or score on the test, itemized grades and scores, actual answers entered by the test-taker, etc.

In step 1604, the report generator 146 may generate a report on each test-taker who took the test and/or a report on all combined test-takers. The report may present the raw results received from the testing interface 132 and may process the results to display statistics, histograms, etc. For example, a report on an individual test-taker may include a histogram of his/her performance on different test-items in the test. A report on all combined test-takers may include the mean, median and standard deviation of test scores, and histograms to show how many test-takers performed at each score level.

The report may include any information associated with the test-taker, e.g. the information provided in the test-taker database 124. The report may also include any information on the accommodation tools permitted for the test-taker, as indicated in the tool settings database 130. The report may further include information obtained from the tool use tracker 142 indicating which accommodation tools 134 were used by the test-taker during the test, e.g. the use of a particular tool for one test-item but the non-use of the tool for another test-item.

In step 1606, the report generator 146 may format the generated report in compliance with state specifications or the specifications of a testing company. The report may also be formatted to show item-level results, i.e. results associated with specific test-items.

In step 1608, after generation and formatting of the report, the report may be stored in the report database 148. The report may also be transmitted securely to a teacher, administrator, institution, etc.

Figure 17:
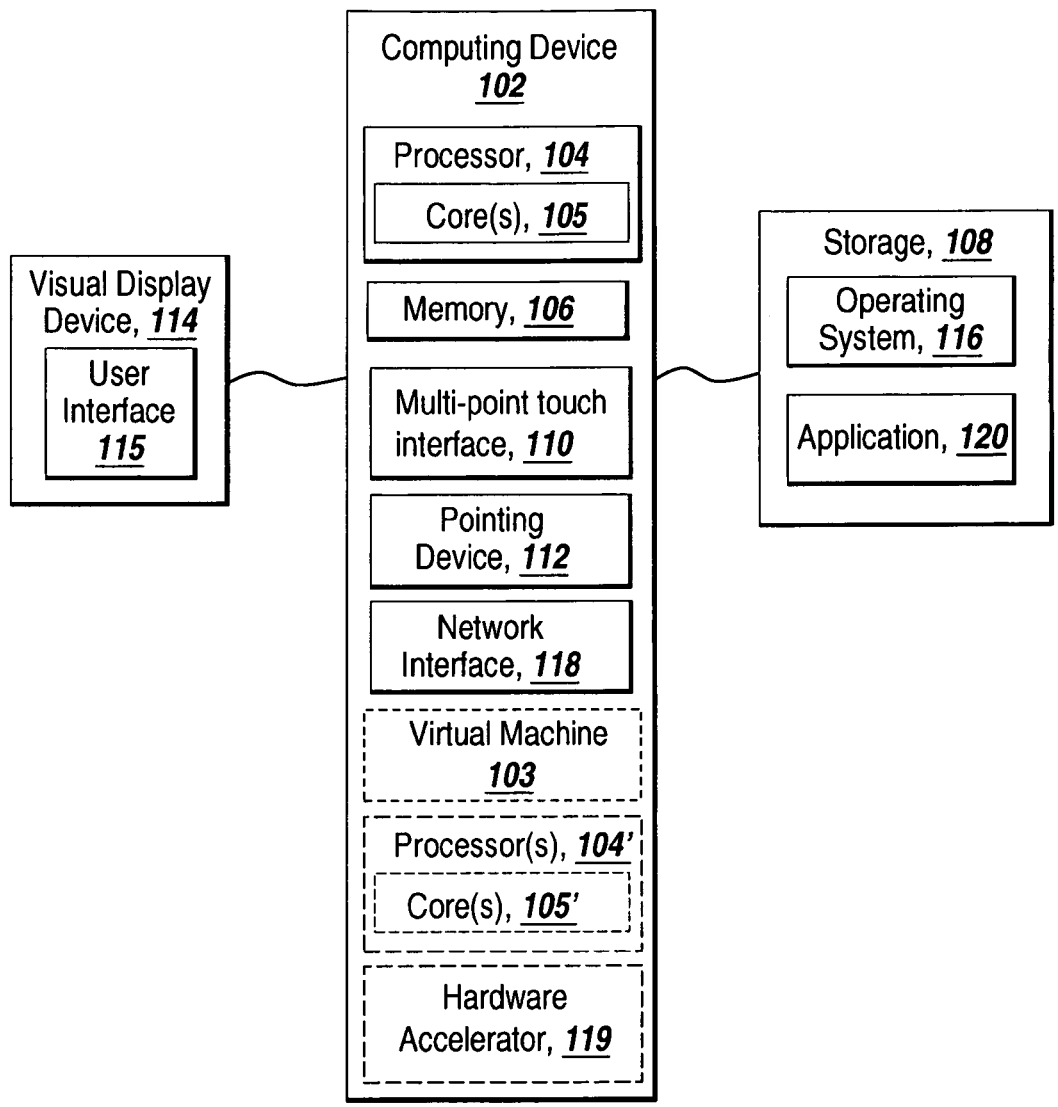
FIG. 17 illustrates a computing environment suitable for practicing an exemplary embodiment.

FIG. 17 illustrates a computing environment suitable for practicing exemplary embodiments. The environment may include a computing device 102 which includes one or more media for storing one or more computer-executable instructions or software for implementing exemplary embodiments. For example, memory 106 included in the computing device 102 may store computer-executable instructions or software, e.g. instructions for implementing and processing every module of the application 120.

The computing device 102 also includes processor 104, and, one or more processor(s) 104' for executing software stored in the memory 106, and other programs for controlling system hardware. Processor 104 and processor(s) 104' each can be a single core processor or multiple core (105 and 105') processor. Virtualization can be employed in computing device 102 so that infrastructure and resources in the computing device can be shared dynamically. Virtualized processors may also be used with application 120 and other software in storage 108. A virtual machine 103 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 119, such as implemented in an ASIC, FPGA, or the like, can additionally be used to speed up the general processing rate of the computing device 102.

The memory 106 may comprise a computer system memory or random access memory, such as DRAM, SRAM, EDO RAM, etc. The memory 106 may comprise other types of memory as well, or combinations thereof. A user may interact with the computing device 102 through a visual display device 114, such as a computer monitor, which may display the tool manager interface 128, the testing interface 132 and any other interface. The visual display device 115 may also display other aspects or elements of exemplary embodiments, e.g. the databases, the result report, tool use data, etc. The computing device 102 may include other I/O devices such a keyboard or a multi-point touch interface 110 and a pointing device 112, for example a mouse, for receiving input from a user. The keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other computer readable media, for storing an operating system 116 and other related software, and for storing application 120, such as the MATLAB® technical computing software.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Figure 18:
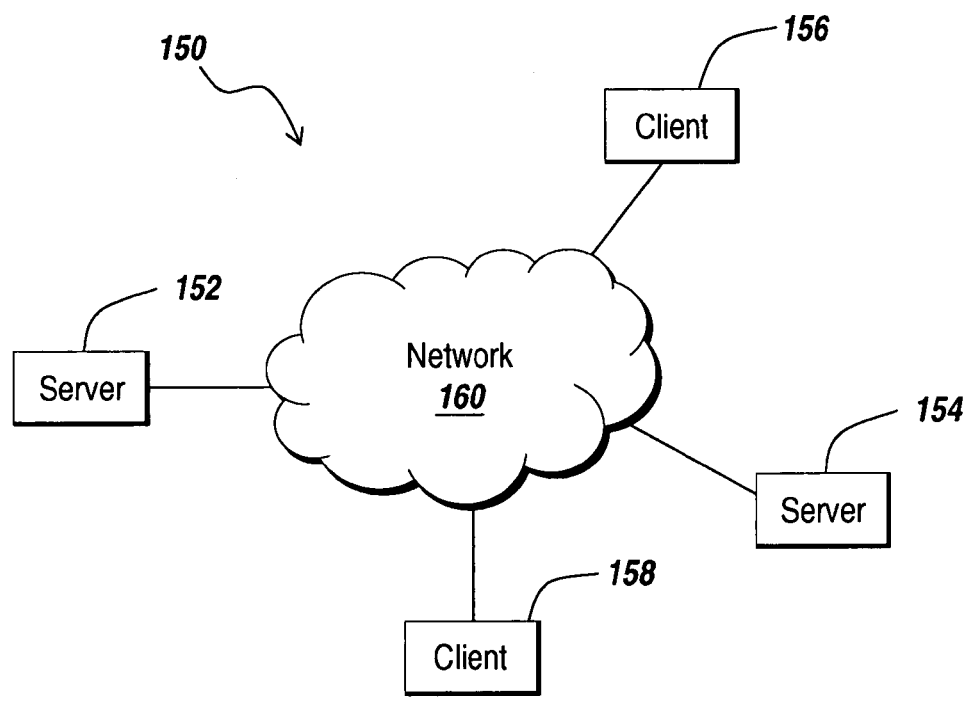
FIG. 18 illustrates an exemplary network environment suitable for the distributed implementation of an illustrative embodiment.

FIG. 18 illustrates an exemplary network environment 150 suitable for a distributed implementation of exemplary embodiments. The network environment 150 may include one or more servers 152 and 154 coupled to clients 156 and 158 via a communication network 160. In one implementation, the servers 152 and 154 and/or the clients 156 and/or 158 may be implemented via the computing device 102. The network interface 118 of the computing device 102 enables the servers 152 and 154 to communicate with the clients 156 and 158 through the communication network 160. The communication network 160 may include Internet, intranet, LAN (Local Area Network), WAN (Wide Area Network), MAN (Metropolitan Area Network), wireless network (e.g., using IEEE 802.11 or Bluetooth), etc. In addition the network may use middleware, such as CORBA (Common Object Request Broker Architecture) or DCOM (Distributed Component Object Model) to allow a computing device on the network 160 to communicate directly with another computing device that is connected to the network 160.

In the network environment 160, the servers 152 and 154 may provide the clients 156 and 158 with software components or products under a particular condition, such as a license agreement. The software components or products may include one or more components of the application 120. For example, the client 156 may allow a test-taker to take a test using the testing interface 132 provided by the application 120 and may send the server 152 test results for processing.

One of ordinary skill in the art will appreciate that the present invention is not limited to the specific exemplary embodiments described herein. Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are in substantially different, even though not identical in other respects to what is shown and described in the above illustrations.

We claim:

1. One or more computer-readable non-transitory media storing one or more computer-executable instructions that when executed cause a computer to implement a test delivery system, the instructions comprising:
    one or more instructions for providing a test from a test database containing only one version of each test item;
    one or more instructions for implementing a plurality of interoperable accommodation tools for facilitating test-taking for test-takers;
    one or more instructions for providing an interface to the test with the plurality of interoperable accommodation tools provided on the interface;
    one or more instructions for receiving one or more tool settings for a test-taker, the one or more tool settings specifying one or more permitted tools in the plurality of interoperable accommodation tools;
    one or more instructions for customizing the interface based on the one or more tool settings to allow the test-taker access to the one or more permitted tools during the test;
    wherein the plurality of interoperable accommodation tools operate on the test items from the test database; and
    one or more instructions for allowing the test-taker to activate, deactivate each of the one or more permitted tools for each of the test items in the test.

2. The one or more non-transitory media of claim 1, wherein interoperability of the plurality of interoperable accommodation tools allows simultaneous activation of more than one accommodation tool, and/or allows activation of a second set of accommodation tools when a first set of accommodation tools is already active.

3. The one or more non-transitory media of claim 1, further including:
    one or more instructions for allowing the test-taker to simultaneously activate a plurality of tools in the one or more permitted tools for each test item in the test.

4. The one or more non-transitory media of claim 3, further including:
one or more instructions for detecting a confusion in using the plurality of tools activated by the test-taker; and
one or more instructions for automatically deactivating a tool in the plurality of tools to resolve the confusion.

5. The one or more non-transitory media of claim 1, further including:
one or more instructions for tracking the use of the one or more permitted tools by the test-taker during the test.

6. The one or more non-transitory media of claim 5, further including:
one or more instructions for detecting the use of a tool for a first test item and the non-use of the tool for a second test item.

7. The one or more non-transitory media of claim 1, wherein:
the plurality of interoperable accommodation tools includes a signing tool; and wherein
the instructions include:
one or more instructions for receiving a selection of a block of text from the test-taker; and
one or more instructions for using the signing tool to present the block of text in American Sign Language or Signed English in a movable window on the interface, the signing tool using a video of a human signer or a signing avatar.

8. The one or more non-transitory media of claim 1, wherein:
the plurality of interoperable accommodation tools includes a read aloud tool; and
wherein the instructions include:
one or more instructions for presenting a plurality of voices, the plurality of voices including a digital recording of a human reader, and a plurality of speeds to the test-taker on the interface;
one or more instructions for receiving a voice and a speed selected by the test-taker; and
one or more instructions for using the read aloud tool to read a portion of text on the interface with the selected voice and at the selected speed.

9. The one or more non-transitory media of claim 1, wherein:
the plurality of interoperable accommodation tools includes a magnification tool; and
wherein the instructions include:
one or more instructions for receiving an area of a test item in the test and an amount of magnification selected by the test-taker, the area of the test item containing text, a graphic image, or a combination of text and a graphic image;
one or more instructions for using the magnification tool to magnify the area by the amount of magnification; and
one or more instructions for displaying the magnified area in a viewing box on the interface and displaying an area outside the viewing box without magnification, the displaying preserving the layout of the test item.

10. The one or more non-transitory media of claim 1, wherein the plurality of interoperable accommodation tools includes one or more of:
a color overlay tool for providing a color overlay over a test item;
a reverse contrast tool for reverse contrasting the color of the interface; and a color chooser for changing a color of a font and a background of the test.

11. The one or more non-transitory media of claim 1, wherein the test comprises one or more test items, the one or more test items being multiple-choice items, short answer items and/or extended response items.

12. The one or more non-transitory media of claim 1, further comprising:
one or more instructions for receiving input related to a test item in the test from an external accommodation device and/or one or more instructions for generating output related to a test result to an external accommodation device.

13. The one or more non-transitory media of claim 1, further comprising:
one or more instructions for receiving a result from the test-taker taking the test with the interface; and
one or more instructions for generating a report of the result, the report including an indication of the one or more tool settings for the test-taker during the test.

14. A computer-implemented method for implementing a test delivery system, the method comprising:
providing a test from a test database containing only one version of each test item;
implementing a plurality of interoperable accommodation tools, the plurality of interoperable accommodation tools facilitating test-taking for test-takers;
providing an interface to the test with the plurality of interoperable accommodation tools provided on the interface;
receiving one or more tool settings for a test-taker, the one or more tool settings specifying one or more permitted tools in the plurality of interoperable accommodation tools;
customizing the interface based on the one or more tool settings to allow the test-taker access to the one or more permitted tools during the test;
wherein the plurality of interoperable accommodation tools operate on the test items from the test database; and
allowing the test-taker to activate and deactivate each of the one or more permitted tools for each of the test items in the test.

15. The method of claim 14, wherein interoperability of the plurality of interoperable accommodation tools allows simultaneous activation of more than one accommodation tool, and/or allows activation of a second set of accommodation tools when a first set of accommodation tools is already active.

16. The method of claim 14, further comprising: allowing the test-taker to simultaneously activate, for each test item, a plurality of tools in the one or more permitted tools.

17. The method of claim 16, further comprising:
detecting a confusion in using the plurality of tools activated by the test-taker; and
automatically deactivating a tool in the plurality of tools to resolve the confusion.

18. The method of claim 14, further comprising:
tracking the use of the one or more permitted tools by the test-taker during the test.

19. A system for implementing a test delivery system, the system comprising
display device for:
displaying an interface to a test with a plurality of interoperable accommodation tools provided on the interface, the plurality of interoperable accommodation tools facilitating test-taking for test-takers;
providing the test from a test database containing only one version of each test item;

receiving one or more tool settings for a test-taker, the one or more tool settings specifying one or more permitted tools in the plurality of interoperable accommodation tools;

customizing the interface based on the one or more tool settings to allow the test-taker access to the one or more permitted tools during the test;

wherein the plurality of interoperable accommodation tools operate on the test items from the test database; and allowing the test-taker to activate and deactivate each of the one or more permitted tools for each of the test items in the test; and a processor for processing the interface and the plurality of interoperable accommodation tools.

20. The system of claim 19, further comprising a signing tool for:

receiving a selection of a block of text from the test-taker; and presenting the block of text in American Sign Language or Signed English in a movable window on the interface, the signing tool using a video of a human signer or a signing avatar.

21. The system of claim 19, further comprising a read aloud tool for:

presenting a plurality of voices and a plurality of speeds to the test-taker on the interface;

receiving a voice and a speed selected by the test-taker; and reading a portion of text on the interface with the selected voice and at the selected speed.

22. The system of claim 19, further comprising a magnification tool for:

receiving an area of a test item in the test and an amount of magnification selected by the test-taker;

magnifying the area by the amount of magnification; and displaying the magnified area in a viewing box on the interface and displaying an area outside the viewing box without magnification, the displaying preserving the layout of the test item.

23. A computer-implemented method for selecting and displaying accommodation tools, the method comprising:

providing a test from a test database containing only one version of each test item;

receiving a group of accommodation tools selected by a test administrator for the test;

receiving a sub-group of accommodation tools from the group of accommodation tools, the sub-group selected by a test-taker taking the test;

displaying the sub-group of accommodation tools on a testing interface to facilitate taking the test by the test-taker; and wherein the accommodation tools operate on the test items from the test database.

24. A computer-implemented method for implementing a test delivery system, the method comprising:

receiving a test from a test database containing only one version of each test item;

implementing a plurality of interoperable accommodation tools, the plurality of interoperable accommodation tools facilitating test-taking for test-takers; providing an interface to the test with the plurality of interoperable accommodation tools provided on the interface;

receiving one or more tool settings for a test-taker, the one or more tool settings specifying one or more permitted tools in the plurality of interoperable accommodation tools;

receiving one or more tool settings for each of one or more test-takers, the one or more tool settings specifying one or more permitted tools in the plurality of interoperable accommodation tools;

for each of the one or more test-takers, customizing the interface based on the one or more tool settings to allow the test-taker access to the one or more permitted tools during the test;

wherein the plurality of interoperable accommodation tools operate on the test items from the test database;

allowing each of the one or more test-takers to activate and deactivate, for each of the test items in the test, each of the one or more permitted tools;

receiving at least one result from at least one of the one or more test-takers taking the test with the interface; and generating a report of the at least one result, the report including an indication of the one or more tool settings for the test-taker during the test.

25. The one or more media of claim 1, wherein the plurality of interoperable accommodation tools includes a language tool for changing a language of the entire interface.

26. The one or more media of claim 8, wherein the instructions further include:

one or more instructions for selecting a pre-defined portion of the interface using an input device, the pre-defined portion including a block of text or a graphic element;

one or more instructions for playing a first sound file assigned to the pre-defined portion of the interface for a first user; and one or more instructions for playing a second sound file assigned to the pre-defined portion of the interface for a second user.

27. The one or more media of claim 8, wherein the instructions further include:

one or more instructions for displaying an audio indicator that plays a sound file associated with an interactive feature of the interface; and one or more instructions for playing the sound file associated with the audio indicator.

28. The one or more media of claim 8, wherein the instructions further include:

one or more instructions for automatically reading aloud content of the interface when the interface is loaded onto a screen.

29. The one or more media of claim 8, wherein the instructions further include:

one or more instructions for automatically playing a sound file associated with a pre-defined portion of the interface when the Tab key on a keyboard is used to access the portion, the portion including text, graphic or interface objects.

30. The one or more media of claim 8, wherein the instructions further include:

one or more instructions for designing a class of content;

one or more instructions for associating the class with a sound file which is played for each individual user; and one or more instructions for playing the sound file associated with the class.

31. The one or more media of claim 8, wherein the instructions further include:

one or more instructions for playing a sound file that describes an action performed by a user on the interface.

32. The one or more media of claim 1, wherein the plurality of interoperable accommodation tools includes an auditory calming tool for playing a sound file, and wherein the instructions further comprise:

one or more instructions for selecting the sound file from a pre-defined set of sound files;
one or more instructions for adjusting a sound volume of the sound file; and
one or more instructions for temporarily pausing the sound file when the sound file is being played.

33. The one or more media of claim 1, wherein the plurality of interoperable accommodation tools includes a keyword translation tool, and wherein the instructions further comprise:
one or more instructions for displaying a translation of a portion of text written in a first language into a second language; and one or more instructions for playing a sound file to read the translation of the portion of the text.

34. The one or more media of claim 1, wherein the plurality of interoperable accommodation tools includes a masking tool for hiding one or more portions of the interface.

35. The one or more media of claim 34, wherein the instructions further comprise:
one or more instructions for hiding one or more navigation buttons, menu-items, menus or test information items.

36. The one or more media of claim 34, wherein the instructions further comprise:
one or more instructions for hiding all answer options for a test item; and one or more instructions for revealing an individual answer option for the test item.

37. The one or more media of claim 34, wherein the instructions further comprise:
one or more instructions for hiding any portion of the interface using one or more electronic cover sheets; and
one or more instructions for allowing the user to alter a size, a shape or a location of the one or more electronic cover sheets.

38. The one or more media of claim 1, wherein the plurality of interoperable accommodation tools includes a restricted viewing tool, and wherein the instructions further comprise:
one or more instructions for hiding the entire interface except a portion of the interface that appears within the restricted viewing tool.

39. The one or more media of claim 38, wherein the instructions further comprise:
one or more instructions for changing a location of the restricted viewing tool using an input device.

40. The one or more media of claim 38, wherein the instructions further comprise:
one or more instruction so for altering a shape or a size of the restricted viewing tool; one or more instructions for altering a level of magnification of the portion of the interface that appears with the restricted viewing tool;
one or more instructions for altering a transparency of a border of the restricted viewing tool; and
one or more instructions for altering a color tint of the portion of the interface that appears within the restricted viewing tool.

41. The one or more media of claim 1, wherein the plurality of interoperable accommodation tools includes one or more of a talking calculator tool, an on-screen keyboard tool, a periodic table tool, and a ruler tool, and wherein the instructions further compromise:
one or more instructions for allowing each of the plurality of interoperable accommodation tools to be interoperable with each other.

42. The one or more media of claim 41, wherein the instructions further comprise:
one or more instructions for manipulating one or more of the plurality of interoperable accommodation tools using an input device.

43. The one or more media of claim 41, wherein the instructions further comprise:
one or more instructions for manipulating one or more of the plurality of interoperable accommodation tools using only two keys on a keyboard.

44. The one or more media of claim 1, wherein the instructions further comprise:
one or more instructions for navigating and operating the interface and any feature of the interface by using only two keys on the keyboard or on another input device, features of the interface including one or more menu items, settings, test items, and accommodation tools;
one or more instructions for navigating among the features of the interface using a first of the two keys; and
one or more instructions for selecting a particular feature of the interface using a second of the two keys.

45. One or more computer-readable non-transitory media storing one or more computer-executable instructions that when executed cause a computer to implement a test delivery system, the instructions comprising:
one or more instructions for providing a test from a test database containing only one version of each test item;
one or more instructions for implementing a plurality of interoperable accommodation tools to facilitate test-taking for test-takers, the plurality of interoperable accommodation tools including a signing tool for: receiving a selection of a portion of the interface from the test-taker, and using a video of a human signer or a signing avatar to present the portion of the interface in American sign language or signed english in a movable window on the interface;
one or more instructions for providing an interface to a test with the plurality of interoperable accommodation tools provided on the interface;
one or more instructions for receiving one or more tool settings for a test-taker, the one or more tool settings specifying one or more permitted tools in the plurality of interoperable accommodation tools;
one or more instructions for customizing the interface based on the one or more tool settings to allow the test-taker access to the one or more permitted tools during the test;
wherein the plurality of interoperable accommodation tools operate on the test items from the test database; and
one or more instructions for allowing the test-taker to activate and deactivate each of the one or more permitted tools for each of the test items in the test.

* * * * *